United States Patent
Beatty et al.

(10) Patent No.: US 10,713,904 B2
(45) Date of Patent: *Jul. 14, 2020

(54) SECURE POINT OF SALE TERMINAL AND ASSOCIATED METHODS

(71) Applicant: Clover Network, Inc., Sunnyvale, CA (US)

(72) Inventors: John Daniel Beatty, Emerald Hills, CA (US); Abhinayak Mishra, Cupertino, CA (US)

(73) Assignee: Clover Network, Inc., Sunnyvale, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 15/782,294

(22) Filed: Oct. 12, 2017

(65) Prior Publication Data
US 2018/0033255 A1    Feb. 1, 2018

Related U.S. Application Data

(63) Continuation of application No. 15/645,912, filed on Jul. 10, 2017, now Pat. No. 9,792,783, which is a (Continued)

(51) Int. Cl.
*G06Q 20/20*    (2012.01)
*G07G 1/00*    (2006.01)
(Continued)

(52) U.S. Cl.
CPC ......... *G07G 1/0009* (2013.01); *G06Q 20/202* (2013.01); *G06Q 20/204* (2013.01);
(Continued)

(58) Field of Classification Search
CPC ...... G07G 1/0009; G07G 1/14; G06Q 20/202; G06Q 20/204; G06Q 20/206; G06Q 20/3823; G06Q 2220/00
(Continued)

(56) References Cited

U.S. PATENT DOCUMENTS 6,630,928 B1 * 10/2003 McIntyre ............ G06F 3/04886
                                                        345/173
6,715,078 B1 *  3/2004 Chasko .................. G06F 21/34
                                                        713/182

(Continued)

FOREIGN PATENT DOCUMENTS

WO    1997045781 A2   12/1997
WO    2000039951 A1    7/2000

OTHER PUBLICATIONS

"Mobile/NFC Security Fundamentals Secure Elements 101", Smart Card Alliance Webinar, Mar. 28, 2013, 42 pages discloses the architecture of a secure element. Slide 7 shows internal memory within a secure element. Slide 6 indicates that Secure Elements are "tamper resistant Smart card chips".

(Continued)

Primary Examiner — James D Nigh
(74) Attorney, Agent, or Firm — Daylight Law, P.C.

(57) ABSTRACT

Methods and systems for processing secure information are disclosed. One method includes receiving secure data from a user via an input device. The method also includes routing the secure data to a secure processor using a hardware multiplexer. The method also includes processing the secure data using the secure processor. The method also includes receiving non-secure data from the user via the input device. The method also includes routing the non-secure data to a second processor using the hardware multiplexer. The method also includes processing the non-secure data using the second processor. The method also includes altering a routing state of the hardware multiplexer using the secure processor. The routing state of the hardware multiplexer is only controlled by the secure processor.

25 Claims, 15 Drawing Sheets

Related U.S. Application Data continuation of application No. 14/877,909, filed on Oct. 7, 2015, now Pat. No. 9,704,355.

(60) Provisional application No. 62/074,061, filed on Nov. 2, 2014, provisional application No. 62/072,420, filed on Oct. 29, 2014.

(51) Int. Cl.
*G07G 1/14* (2006.01)
*G06Q 20/38* (2012.01)

(52) U.S. Cl.
CPC ....... *G06Q 20/206* (2013.01); *G06Q 20/3823* (2013.01); *G07G 1/14* (2013.01); *G06Q 2220/00* (2013.01)

(58) Field of Classification Search
USPC .......................................................... 705/72
See application file for complete search history.

(56) References Cited

U.S. PATENT DOCUMENTS

| | | | | |
|---|---|---|---|---|
| 8,150,039 B2* | 4/2012 | de Cesare | ............. | G06F 21/575 380/277 |
| 2002/0091826 A1* | 7/2002 | Comeau | ................. | G06F 9/546 709/226 |
| 2003/0070011 A1* | 4/2003 | Naruse | .................... | G06F 13/28 710/52 |
| 2003/0135418 A1* | 7/2003 | Shekhar | ................. | G06Q 20/20 705/16 |
| 2003/0154336 A1* | 8/2003 | Ballantyne | ............ | G06F 13/385 710/110 |
| 2003/0159044 A1* | 8/2003 | Doyle | .................... | G06F 21/32 713/176 |
| 2004/0088459 A1* | 5/2004 | Gary | ..................... | G06F 3/0613 710/244 |
| 2004/0186762 A1* | 9/2004 | Beaven | .............. | G06Q 10/0633 705/7.27 |
| 2005/0080967 A1* | 4/2005 | Ries | ...................... | G06F 13/364 710/240 |
| 2007/0226795 A1* | 9/2007 | Conti | .................... | G06F 21/554 726/22 |
| 2007/0280475 A1* | 12/2007 | Dellow | .............. | G06F 12/1408 380/33 |
| 2008/0162745 A1* | 7/2008 | Tkacik | .................. | G06F 13/364 710/33 |
| 2009/0083862 A1* | 3/2009 | Avraham | ................ | G06F 21/53 726/34 |
| 2012/0237029 A1* | 9/2012 | Nason | .................... | G06F 21/82 380/210 |
| 2012/0265981 A1* | 10/2012 | Moon | ................... | G06F 3/0416 713/150 |
| 2012/0299831 A1* | 11/2012 | Lioy | ....................... | G06F 21/36 345/168 |
| 2012/0305648 A1* | 12/2012 | Sondhi | ................. | H05K 1/0275 235/441 |
| 2013/0145475 A1* | 6/2013 | Ryu | ........................ | G06F 21/31 726/26 |
| 2013/0147745 A1 | 6/2013 | Whytock et al. | | |
| 2013/0191925 A1* | 7/2013 | Ditzman | ................. | G06F 21/83 726/26 |
| 2013/0290637 A1* | 10/2013 | Turean | .................. | G06F 12/084 711/122 |
| 2013/0291053 A1* | 10/2013 | Buer | ....................... | G06F 21/53 726/1 |
| 2014/0013406 A1* | 1/2014 | Tremlet | .................. | G06F 21/32 726/5 |
| 2014/0074635 A1* | 3/2014 | Reese | ................ | G06Q 20/4014 705/21 |
| 2014/0092421 A1* | 4/2014 | Shibata | .............. | H04N 1/00233 358/1.14 |
| 2014/0096222 A1* | 4/2014 | Colnot | .................... | G06F 21/31 726/9 |
| 2014/0187153 A1* | 7/2014 | Zhu | ........................... | H04B 5/02 455/41.1 |
| 2015/0121086 A1* | 4/2015 | Smith | ...................... | G06F 21/72 713/189 |
| 2015/0161579 A1* | 6/2015 | Madden | ............... | G06Q 20/206 705/18 |
| 2015/0199668 A1* | 7/2015 | Fernando | ............. | G06Q 20/203 705/14.65 |
| 2016/0048833 A1* | 2/2016 | Huxham | ................ | G06Q 20/20 705/71 |

OTHER PUBLICATIONS

CMPEN 411, VLSI Digital Circuits, Spring 2012, Lecture 02: Design Metrics, Kyusan Choi, 34 pages.
International Search Report and Written Opinion dated Apr. 21, 2016 for PCT Application No. PCT/US2015/057863.
Kili Technology Unveils First MPOS Solution-on-a-Chip, Kili Technology, Oct. 28, 2014, Available at: http://globenewswire.com/news-release/2014/10/28/677133/10104759/en/Kiii-Technology-Unveils-First-mPOS-Solution-on-a-Chip.html (Accessed on Sep. 29, 2015).
Notice of allowance dated Aug. 21, 2017 for U.S. Appl. No. 15/645,912.
Notice of Allowance dated Jan. 5, 2017 for U.S. Appl. No. 14/927,101.
Office Action dated Feb. 2, 2016 for U.S. Appl. No. 14/877,909.
Office Action dated Jan. 4, 2017 for U.S. Appl. No. 14/877,909.
Office Action dated Jun. 9, 2016 for U.S. Appl. No. 14/877,909.
Office Action dated Nov. 10, 2016 for U.S. Appl. No. 14/925,966.
The Great Debate: SOC vs. SIP, EE Times, Mar. 2, 2015, 5 pages.
Yield and Yield Management, Cost Effective ICE Manufacturing 1998-1999, Oct. 8, 1997, Integrated Circuit Engineering Corporation, 21 pages.

* cited by examiner

400

1300

SECURE POINT OF SALE TERMINAL AND ASSOCIATED METHODS

CROSS-REFERENCE TO RELATED APPLICATIONS

This application is a continuation of U.S. application Ser. No. 15/645,912, filed Jul. 10, 2017, which is a continuation of U.S. application Ser. No. 14/877,909, filed Oct. 7, 2015, which claims the benefit of U.S. Provisional Application No. 62/072,420, filed Oct. 29, 2014, and U.S. Provisional Application No. 62/074,061, filed Nov. 2, 2014, all of which are incorporated by reference in their entirety herein for all purposes.

BACKGROUND

Point-of-sale (POS) systems allow users, such as merchants, to offer customers flexibility in completing goods or services sales transactions. However, such systems may not provide a mechanism for secure transactions such as entering a PIN (personal identification number) associated with a credit, debit, EMV, and other payment cards, including cards having embedded integrated circuits for, among other things, authentication. The relative lack of security may lead to identity theft or fraudulent transactions, and ultimately a relatively poor consumer and/or merchant experience.

Point of sale terminals need to have a secure operating environment that guarantee unscrupulous people cannot steal sensitive data or hijack the payment processing capabilities of the device. Unfortunately, this results in POS terminals that are closed systems, and have very limited applications that can be used to customize and augment the terminal functionality. In addition, the terminal needs a dedicated PIN pad that needs to be physically protected to meet strict security requirements and needs physical and logical security to isolate sensitive data from the regular operating environment.

SUMMARY

In one embodiment, a device is provided. The device comprises an input device with an input device user data connection to an input device controller. The device also comprises a multiplexer with a multiplexer control input port, a multiplexer data input port communicatively coupled to the input device controller, a first data output port, and a second data output port. The device also comprises a secure processor with: (i) a control output port communicatively coupled to the multiplexer control input port; and (ii) a secure processor data input port communicatively coupled to the first data output port. The device also comprises a second processor with a second processor data input port communicatively coupled to the second data output port. The multiplexer is configurable between a first state and a second state. The multiplexer data input port is communicatively coupled to the first data output port through the multiplexer when a current state of the multiplexer is the first state. The multiplexer data input port is communicatively coupled to the second data output port through the multiplexer when the current state of the multiplexer is the second state. The current state of the multiplexer is exclusively controlled by the secure processor via the control output port.

In another embodiment, an integrated circuit is provided. The integrated circuit comprises a multiplexer with a multiplexer control input port, a multiplexer data input port, a first data output port, and a second data output port. The integrated circuit also comprises an input pin communicatively coupled to the multiplexer data input port. The integrated circuit also comprises a multiplexer control circuit communicatively coupled to the multiplexer control input port. The integrated circuit also comprises an input device data processing circuit communicatively coupled to the first data output port. The integrated circuit also comprises an output pin communicatively coupled to the second data output port. The multiplexer is configurable between a first state and a second state via the multiplexer control circuit. The multiplexer data input is communicatively coupled to the first data output port through the multiplexer when the current state of the multiplexer is the first state. The multiplexer data input is communicatively coupled to the second data output port through the multiplexer when the current state of the multiplexer is the second state.

In another embodiment, a method is provided. The method comprises receiving secure data from a user via an input device. The method also comprises routing the secure data to a secure processor using a hardware multiplexer. The method also comprises processing the secure data using the secure processor. The method also comprises receiving non-secure data from the user via the input device. The method also comprises routing the non-secure data to a second processor using the hardware multiplexer. The method also comprises processing the non-secure data using the second processor. The method also comprises altering a routing state of the hardware multiplexer using the secure processor. The routing state of the hardware multiplexer is only controlled by the secure processor.

In another embodiment, another method is provided. The method comprises receiving secure data from a user via an input pin of an integrated circuit. The method also comprises routing the secure data to an input device data processing circuit using a hardware multiplexer. The method also comprises processing the secure data using the input device data processing circuit. The method also comprises receiving non-secure data from the user via the input pin. The method also comprises routing the non-secure data to an output pin of the integrated circuit using the hardware multiplexer. The method also comprises altering a routing state of the hardware multiplexer using the secure processor. The routing state of the hardware multiplexer is only be controlled by the secure processor.

DETAILED DESCRIPTION OF THE EMBODIMENTS

Figure 1:
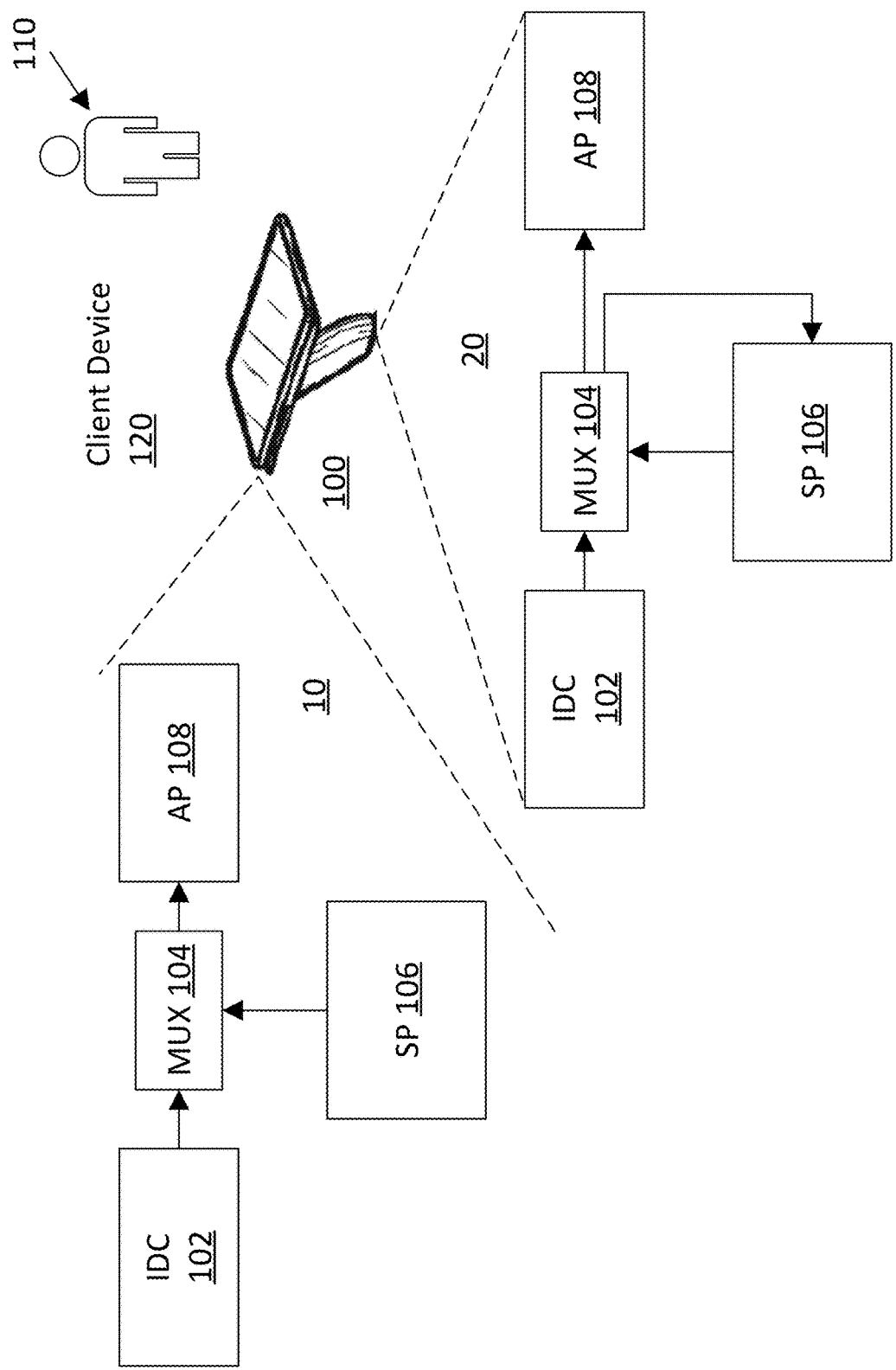
FIG. 1 illustrates two architectures for a client device in a secure POS platform that are in accordance with one or more example embodiments.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Described herein are systems and methods for providing secure POS (point-of-sale) platforms and associated methods. Certain embodiments of the systems and methods described herein may facilitate providing a secure POS platform to provide secure interactions with local services and/or third-party applications during one or more POS transactions (e.g., financial transactions, login sessions, etc.) at physical and/or remote locations. Further, certain embodiments of the systems and methods may also provide or otherwise facilitate secure communication with a user of the POS platform. POS transactions on a POS platform may influence the selection of data communication channels within the secure POS platform, where these data communication channels may be used to process the data associated with one or more POS transactions. For example, a merchant may use a POS platform to complete a transaction with a customer who may have placed an order for goods or services (e.g., purchasing milk, etc.), where the merchant or the customer may swipe a credit card to complete the transaction. Based upon the type of transaction, the POS platform may choose one or more data channels to access one or more processors within the POS platform to complete the transaction. For example, if the transaction involves secure data, such as credit card information or a personal identification number (PIN) a secure channel may be used; whereas if the transaction involves unsecure data, such as the entry of a quantity of milk to be purchased, a non-secure channel may be used. The one or more data channels can be used to process or otherwise complete the transaction.

Although a bulk of the disclosure is directed to a POS platform used to facilitate a financial transaction between an owner of the terminal and another party, the approaches described herein are more broadly applicable to any device that is used to handle both secure and non-secure data. For example, an ATM may include an account management system and may also include an application for ordering stamps or other applications that do not require the receipt of secure data from the user. As another example, a tablet computer may include core applications that are used to interact with financial institutions or ecommerce systems while other applications can be added to the device that do not require the use of secure information. Any of these and similar devices can benefit from some of the approaches described herein.

POS Platform Overview

As shown in FIG. 1, secure POS platform 100 may include a number of hardware components including input device controller (IDC) 102, multiplexer (MUX) 104, secure processor (SP) 106, and application processor (AP) 108. Throughout this specification, a touch screen will be used as an exemplary input device such that the input device controller may be referred to as a touch controller (TC). However, as mentioned previously, the input device controller could be a controller for any number of input devices or user interfaces such as a keypad, audio interface, or wireless interface. The above are only examples of components that may be included in a secure POS platform, such as 100, and other components may also be included.

Referring to FIG. 1, there is shown an example schematic view of a secure POS platform 100 in accordance with one or more example embodiments. In FIG. 1, secure POS platform 100 can include one or more components, such as 102, 104, 106, and 108 that are internal to associated client device 120, which can be a merchant POS device. Client device 120 may be operated by a user 110 entering various information for a purchase transaction via an associated input device associated with the client device 120 to facilitate a purchase transaction. The input device could be a touch screen integrated with the client device 120. The input device could be a multiuse input device such that it is used for both secure operations and normal (non-secure) operations. Secure POS platform 100 may evaluate whether the certain user inputs via the multiuse input device are associated with either secure operations or normal (non-secure) operations. An example of a secure operation is entering a PIN. An example of a non-secure operation is entering a quantity of an item to be purchased via the same touch screen.

The hardware components, such as 102, 104, and 106, may be interconnected to provide various functions in response to certain actions performed by user 110 with respect to client device 120, such as inputting information via an associated input device or user interface. The hardware components can be implemented as individual integrated circuits (ICs) on a main board of client device 120. However, MUX 104 and SP 106 could also be implemented on a single application specific integrated circuit (ASIC)

while IDC 102 and AP 108 are kept as separate ICs. The chip comprising MUX 104 and SP 106 could then be used as a "secure chip" in a chip set comprising the secure chip, IDC 102, and AP 108. As will be described later, integrating MUX 104 and SP 106 onto a single chip provides certain benefits in that IDC 102 and AP 108 could be commercially available ICs that are broadly available beyond the more limited market for specialized secure POS hardware. In other words, an application processor chip and peripheral controller chip could be standard devices for the control of peripherals and running applications generally, and do not need to be augmented in any manner to realize the security benefits of some of the approaches described herein. Any of the functions performed by SP 106 that are disclosed in this specification could be executed on the secure chip. For example, tamper detection circuitry implemented on the secure chip could receive a tamper indication from a tamper sensor and clear a memory implemented on the secure chip to protect encryption keys or other secure information stored on the secure chip.

AP 108 can be a standard processor used to implement an operating system for client device 120. For example, AP 108 can run the Android OS™. In general, the AP can maintain full control over the client device 120 while the device is running applications that don't require secure information. For example, the main application run by the AP 108 could be the standard merchant-facing retail checkout application used to accept inputs regarding a customer's order and tally the total of a specific purchase transaction. As another example, the main application run by AP 108 could be a restaurant server's ordering application used to input orders taken by the server. AP 108 can operate with a cache and main memory that are physically separate from the memory used by SP 106. This configuration provides certain benefits in that certain attacks may use a processor to write instructions to memory for later execution and exploitation of a secure program running on the same processor, or may use the processor to read and illicitly obtain data from the memory which was utilized and left over by a secure program using the same memory. These kinds of vulnerabilities can be avoided by not allowing the AP to have access to the same memory as the SP.

MUX 104 is a hardware multiplexer that receives control inputs from SP 106 and routes data received from IDC 102 to one or more data channels based on those control inputs. The data could be routed through transistors that turn on or off in response to control signals. MUX 104 could be an IC with one or more control pins, one or more input pins and at least two output pins. In approaches where MUX 104 and SP 106 were implemented on a single chip, MUX 104 could be a block of analog circuitry on the secure chip controlled by a digital output from SP 106. In such approaches, MUX 104 and SP 106 could exchange information via interconnects in the IC.

In one embodiment, illustrated by the region of FIG. 1 indicated by reference number 10, a secure transaction process can be implemented using the hardware components shown in FIG. 1. For example, when user 110 interacts with an input device or user interface associated with client device 120, IDC 102 can transmit certain user inputs to MUX 104. In certain instances, when secure POS platform 100 detects or prompts user entry of secure data (e.g., a user entering PIN information) via the input device or user interface associated with client device 120, the operation is treated as a secure transaction and/or operation. In this instance, SP 106 can control the flow of secure data through MUX 104.

FIG. 1 illustrates another example schematic view of a secure POS platform which is illustrated by the region of FIG. 1 indicated by reference number 20, which is in accordance with one or more example embodiments. In the embodiment shown 20, entry of data that may be considered non-secure (normal mode) can be facilitated via the hardware components, such as 102, 104, 106, and 108 of client device 120, such that data passes from a peripheral to AP 108. For example, IDC 102 may communicate user inputs to MUX 104, such as when user 110 interacts with an associated input device or user interface. MUX 104 can then pass the information received from this interaction to AP 108. AP 108 may then perform transactions and/or operations that may be considered non-secure. In addition, entry of data that may be considered secure can be facilitated via the same hardware components, such as 102, 104, 106, and 108 of client device 120. However, the data from the peripheral will now be routed to SP 106 instead of AP 108. For example, under the control of SP 106, MUX 104 will route input data from the peripheral to SP 106. SP 106 may then perform operations on the data that may be considered secure. IDC 102 may be completely unaware as to which processor the input data is being routed to.

Example Network Architecture

Figure 2:
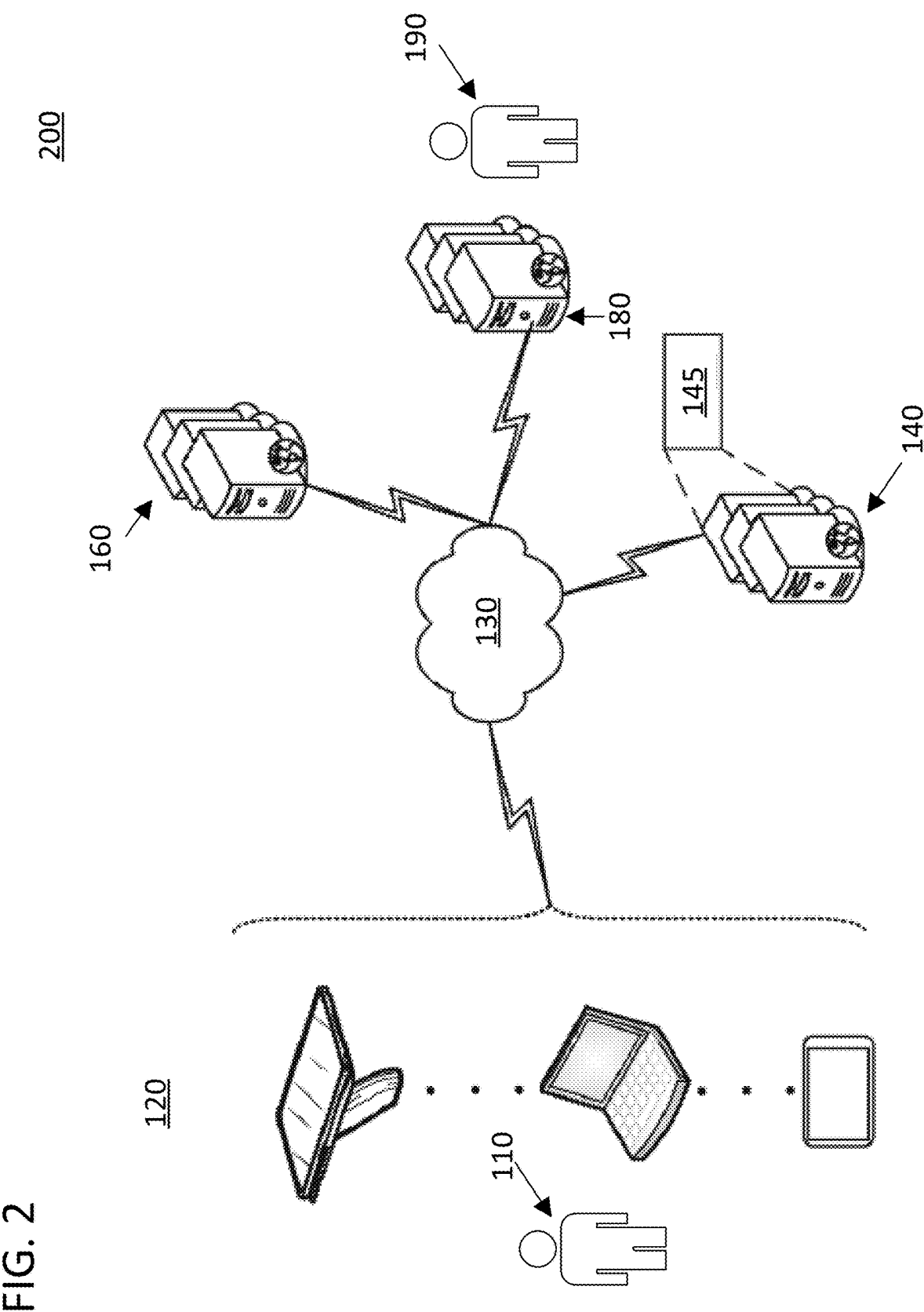
FIG. 2 illustrates an example network architecture for a secure POS platform in accordance with one or more example embodiments.

Referring now to FIG. 2, there is shown an example network architecture of a secure POS platform 200 according to certain embodiments of the disclosure. The network architecture of the secure POS platform 200 may include one or more client devices 120. Client devices 120 can communicate via a network with back-end servers 140, remote services servers 160, and control servers 180. Each of the components in network architecture of the secure POS platform 200 are discussed in more detail below.

The one or more client devices 120 may be a merchant POS device, a laptop computer, a desktop computer, another device with computer functionalities, or any combination thereof and/or other types of devices associated with a merchant at various locations. For example, a client device, such as 120 may be a POS terminal provided by First Data Corporation of Atlanta, Ga. Other examples of client device 120 may be purpose-built POS equipment, a self-service kiosk, a smart phone, a tablet, a wearable computer device, or an e-reader operating a mobile operating system, such as Android OS™. An example hardware architecture of a particular client device that can be used in place of client device 120 is illustrated and described in FIG. 6 below.

In FIG. 2, each client device 120 may communicate with one or more remote services servers 160 via a client API, which may be used to access the services and functionalities provided by the remote services servers 160. Each of the client devices 120 may also communicate with the one or more remote services servers 160 via one or more networks 130. The one or more remote services servers 160 may be one or more independent computer systems, such as the computer system 400 of FIG. 4. In some embodiments, the one or more remote services servers 160 may be a cloud-based computer system, where no on-premise servers are required, which may reduce relative cost and complexity of hardware, installation, and ongoing maintenance and administration.

The network architecture of the secure POS platform 200 may also include one or more back-end servers 140. The one or more back-end servers 140 may be coupled to the one or more remote services servers 160 via a respective or single back-end API 145. The back-end API 145 may be an application programming interface for the one or more back-end servers 140 to supplement the services provided by the one or more remote services servers 160. The one or more back-end servers 140 may communicate with the one or more remote services servers 160 via network 130 as well. The one or more back-end servers 140, and/or the remote services servers 160 may be configured to handle financial transactions by authorizing or declining transactions. Each of the back-end servers 140 may be one or more independent computer systems, such as the computer system 400 of FIG. 4, for performing back-end processes for purchase transactions.

The secure POS platform 200 may also include one or more control servers 180. Each of the control servers 180 may provide secure communication sessions between a customer support representative (e.g., user 190) and one or more client devices (e.g., client devices 120). The one or more control servers 180 may be one or more independent computer systems, such as the computer system 400 of FIG. 4.

The one or more networks 130 may be a system for communication. Each of the networks 130 may encompass a variety of mediums of communication, such as wired communication for one part and wireless communication for another part. The one or more networks 130 may be part of the Internet.

For example, a network, such as 130, may include an Ethernet or other wire-based network or a wireless NIC (WNIC) or wireless adapter for communicating with a wireless network, such as a WI-FI network. The network 130 may include any suitable network for any suitable communication interface. As an example and not by way of limitation, the network channel may include an ad hoc network, a personal area network (PAN), a local area network (LAN), a wide area network (WAN), a metropolitan area network (MAN), or one or more portions of the Internet or a combination of two or more of these networks. One or more portions of one or more of these networks may be wired or wireless. As another example, the network may be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the one or more networks 130 may use standard communications technologies and/or protocols. Thus, each network 130 may include links using technologies such as Ethernet, 802.11, worldwide interoperability for microwave access (WiMAX), 3G, 4G, CDMA, digital subscriber line (DSL), etc. Similarly, the networking protocols used on the network may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network may be represented using technologies and/or formats including the hypertext markup language (HTML) and the extensible markup language (XML). In addition, all or some of links may be encrypted using conventional encryption technologies such as secure sockets layer (SSL), transport layer security (TLS), and Internet Protocol security (IPsec).

Example Architecture for Secure POS Platform Components

Figure 3:
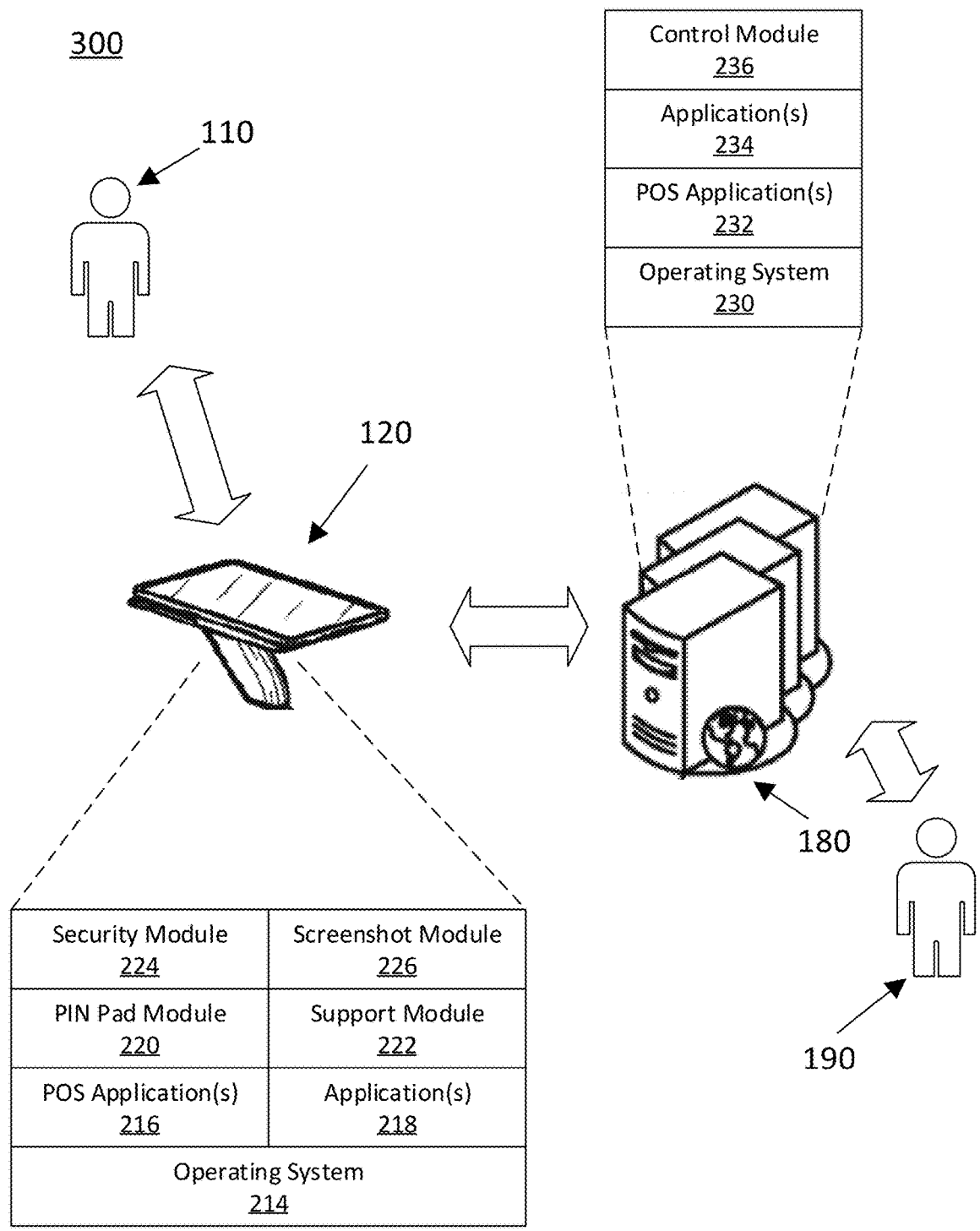
FIG. 3 illustrates an example component architecture for certain components of the secure POS platform shown in FIG. 2 in accordance with one or more example embodiments.

Turning to FIG. 3, there is shown a diagrammatic representation of an example internal architecture 300 of certain components of secure POS platform 200 shown in FIG. 2 in accordance with one or more embodiments of the disclosure. The example internal architecture 300 may interact with one or more users (e.g., user 110) operating one or more client devices (e.g., client device 120) communicating with one or more control servers (e.g., control server 180).

The client device 120 may include a client operating system 214, at least one point-of-sale application (e.g., POS application 216), and one or more applications (e.g., application(s) 218). Additionally, client device 120 may be configured to provide a number of services via internal modules. For example, client device 120 may include a PIN pad module 220, support module 222, a security module 224, and/or screenshot module 226.

Each of the modules can operate individually and independently of other modules. Some or all of the modules can be combined as one module. A single module can also be divided into sub-modules, each performing a separate method operation or method operations of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module. In some approaches, the SP 106 will include separate modules that do not share access to the same memory space as the modules operating on AP 108. In addition, in certain approaches client device 120 will include two operating systems, one operating on SP 106 and one operating on AP 108.

The client device 120 may include additional, fewer, or different modules for various applications. Conventional components such as network interfaces, security functions, load balancers, failover servers, management and network operations consoles, and the like are not shown so as to not obscure the details of the system.

The operating system 214 may be an operating system of the client device 120, such as Android™ or iOS™ or any other operating system that may be suitable for a point-of-sale system. The operating system 214 may be an open or closed format.

The POS application 216 may contain modules executable on the client device 120 to perform point-of-sale services (e.g., Clover™, or any other POS services). The POS application(s) 216 may run on the AP 108. The POS application 216 may include a timecards module, a self-serve module, a register module, a store inventory module, or any combination thereof. The one or more applications, such as 218, may include applications that may be built-in or may be provided by third-party applications. For example, one or more applications 218 may include a register module, which may be configured to provide an interface for a merchant to facilitate sales transactions in a business. The register module may have bar code scanner functionality, check-out functionality, payment functionality, or any combination thereof. It is understood that the register module is one of many possible modules that may exist within one or more application(s) 218 executing on respective client devices 120, and that other modules may be implemented. The application(s) 218 may run on the AP 108.

Client device(s) 120 may include applications that are built-in or provided by third-party entities. For example, application(s) 218 may include a register module, which may be configured to provide an interface for an operator of the merchant/business to facilitate sales transactions. The register module may have bar code scanner functionality, check-out functionality, payment functionality, or any combination thereof. Application(s) 218 may also include screenshot module 226, which may be configured to communicate with operating system 214 to request screenshots of client device(s) 120. A screenshot may be a screen capture of client device(s) 120 at a certain instance. The captured screenshots may be sent to control server 180 for viewing by user 190. An administrator or other users may choose the interval value to allow for continuous viewing of the screenshots. For example, every 1 millisecond, screenshot module 226 may capture a screenshot of client device(s) 120. Screenshot module 226 may send the captured screenshots to control server 180 so user 190 may view actions taken at the client device(s) 120 by user 110. The interval may be within a predetermined threshold time value. The predetermined threshold time value may be selected to allow consecutive viewing of the screenshots (similar to a video) by user 190. The predetermined threshold may determine the number of screenshots taken each second resulting in continuous viewing by the user 190. An interval value higher than the threshold may result in flickering while being viewed by the user 190. An Interval value lower than the threshold may result in continuous viewing but may impact performance since more screenshots may be taken each second.

The PIN pad module 220 may be configured to allow a user (e.g., user 110) to interact with a particular client device, such as 120. PIN pad module 220 may allow customers to enter information associated with a transaction, such as a sales transaction. PIN pad module 220 may be configured to operate with either a touch screen or a physical PIN pad system, for example, the First Data® FD-40 device provided by First Data Corporation of Atlanta Ga., associated with client device 120. PIN pad module 220 may be configured to operate in a secure or insecure mode. A secure mode may be a mode that may require heightened security when entering information (e.g., payment authentication information). In other approaches, PIN pad module 220 may be configured to operate in the same manner whether it is in secure or insecure mode while alternate modules in the device adjust their characteristics to reflect the current mode of device 120.

PIN pad module 220 may be configured to operate with operating system 214 in a secure mode even if operating system 214 is an open format (e.g., Windows™, and Android™). The information may be related to a debit card or a credit card, or a gift card, or any other form of information related to a point-of-sale system. For example, a customer (e.g., user 110) may be purchasing a product from a business using a debit card. The customer may enter a code associated with the debit card in order to facilitate or otherwise complete the transaction.

Support module 222 may be configured to provide a user (e.g., user 190) to control client device 120 for performing maintenance or guidance activities. For example, user 190 may be at least one of a manager, a customer support personnel, or an administrator of the POS network, or any other person responsible for maintenance or guidance activities. For example, customer support personnel (e.g., user 190) may take control of client device 120 to assist the merchant (e.g., user 110) in debugging/resolving one or more issues with client device 120 or to answer questions about that device. It may also be used by a manager who may provide guidance and support for an employee at client device 120. For example, a merchant (e.g., user 110) may contact a customer service representative (e.g., user 190) to report an issue with a client device (e.g., client device 120).

Security module 224 may be configured to handle payment transaction information, including a PIN or a card number. In one example embodiment, security module 224 may operate in a secure mode and may comply with one or more industry standards for secure transactions. For example, Payment Card Industry (PCI) as a governing body for payment security may provide one or more guidelines and/or rules to follow when implementing a secure sales transaction. For example, operating a physical PIN pad may allow for better control for implementing secure sales transaction. However, operating a touch screen PIN pad may present challenges. In one embodiment, PIN pad module 220 may operate a touch screen PIN pad that allows a user to enter the PIN of their debit card. Security module 224 may be configured to operate with one or more processing units to implement secure sales transactions. For example, a client device, such as 120, may be configured to operate using a processing unit that may be dedicated for secure operations and an insecure processing unit dedicated for insecure operations. Secure operations may be, for example, swiping a credit card, entering a PIN for a debit card, or any other operation related to executing a secure transaction. Insecure operations include any operation that may be related to using client device 120 without handling secure data. For example, during a sales transaction, if a customer swipes his or her credit card, security module 224 may select a secure processing unit to complete the transaction. In a particular class of implementations, the selection of the secure processor units may involve the security module initiating a transition in the control signal or signals that are provided to MUX 104. Although the above example is presented with two processing units, other combinations of secure and insecure processors may be envisioned. For example, a single processing unit may be divided into two areas, one secure and one insecure, or a plurality of processing units may be separated into secure or insecure processor groups.

Security module 224 may be implemented independent of operating system 214. For example, this may allow developers to work independently from the firmware of operating system 214, which may allow for better code control. Security module 224 may also be implemented using a physically separate memory from the other modules. Security module 224 may execute its instructions using SP 106 and a physically separate memory from the memory used by AP 108. As mentioned above, in certain approaches PIN pad module 220, and other modules in device 120, do not require information as to whether the device is operating in a secure or non-secure mode.

Control server 180 may include operating system 230, at least one point-of-sale application (e.g., POS application 232), and at least one application (e.g., application(s) 234). Additionally, control server 180 may be configured to provide a number of services via internal modules. For example, control server 180 may include control module 236. The description of operating system 230, the at least one point-of-sale application (e.g., POS application 232), and at least one application (e.g., application(s) 234) may be substantially similar to the description of operating system 214, the at least one point-of-sale application (e.g., POS application 216), and the one or more applications (e.g., application(s) 218), respectively, of the client device 120.

Example Computing Device Architectures

Figure 4:
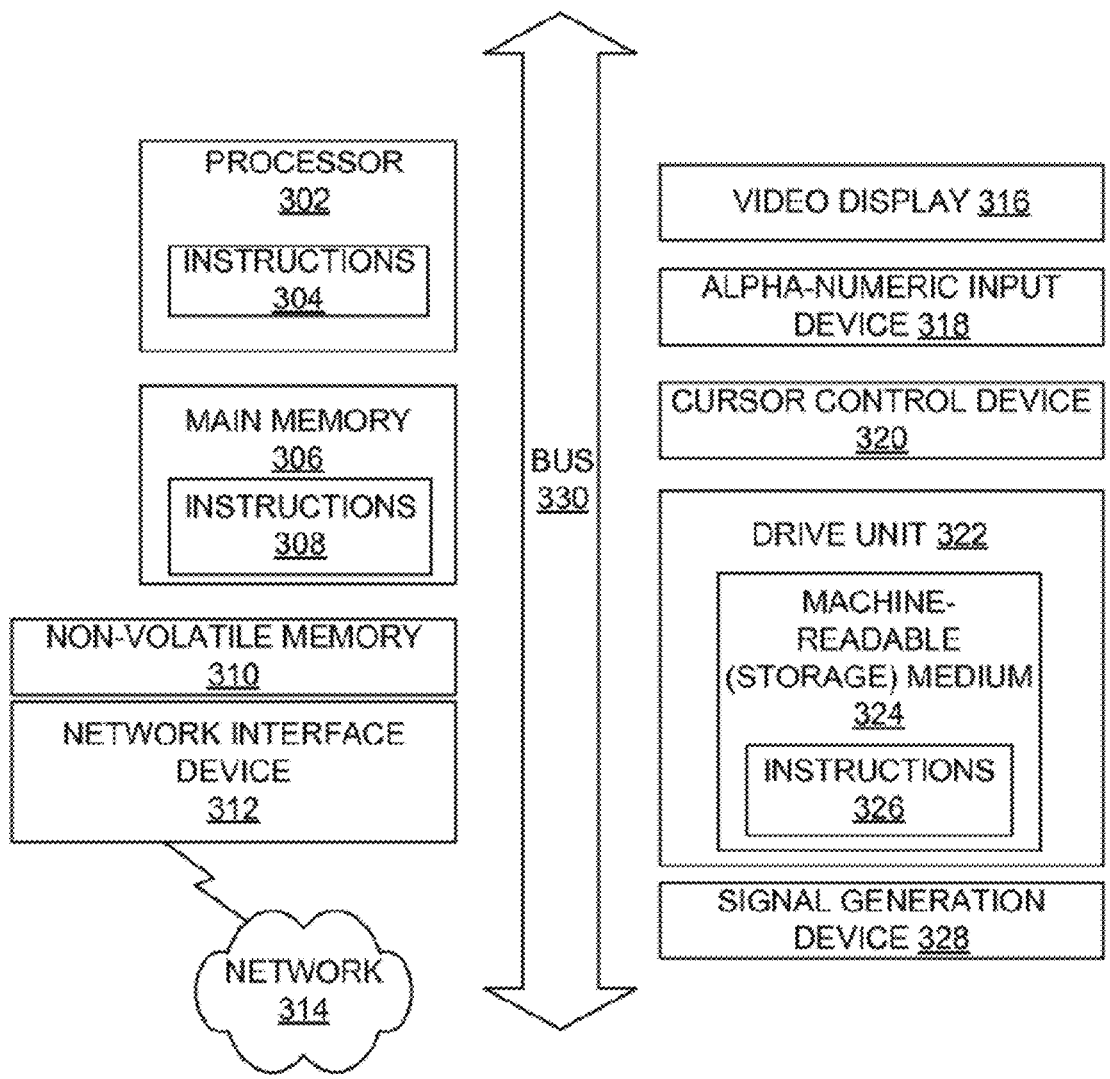
FIG. 4 illustrates a diagram of an example computer system for certain components of the secure POS platform shown in FIG. 2 in accordance with one or more example embodiments.

In the example of FIG. 4, the computer system 400 may include a processor 302, a main memory 306, a non-volatile memory 310, and a network interface device 312. Various common components (e.g., cache memory) are omitted for illustrative simplicity. The computer system 400 is intended to illustrate example sub-components of the secure POS platform depicted in FIGS. 2-3. The computer system 400 may be of any applicable known or convenient type. The sub-components of the computer system 400 may be coupled together via a bus 330 or through some other known or convenient device.

This disclosure contemplates the computer system 400 taking any suitable physical form. As an example and not by way of limitation, the computer system 400 may be an embedded computer system, a custom built device and/or platform, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable computer device, a server, or a combination of two or more of these systems or devices. Where appropriate, the computer system 400 may include one or more computer systems 400; be unitary or distributed; span multiple locations; span multiple machines; or reside in a cloud, which may include one or more cloud components in one or more networks. Where appropriate, one or more computer systems 400 may perform, without substantial spatial or temporal limitation, one or more steps of one or more methods described or illustrated herein. As an example and not by way of limitation, one or more computer systems 400 may perform in real time or in batch mode one or more operations of one or more methods described or illustrated herein. One or more computer systems 400 may perform at different times or at different locations one or more operations of one or more methods described or illustrated herein, where appropriate.

The processor 302 may be, for example, a conventional microprocessor such as an Intel™ Pentium™ microprocessor or Motorola™ Power IDC™ microprocessor. One of skill in the relevant art may recognize that the terms "machine-readable (storage) medium" or "computer-readable (storage) medium" include any type of device that can store data or instructions for the processor. The processor 302 may include computer-executable instructions 304.

The main memory 306 may be coupled to the processor 302 by, for example, a bus 330. The main memory 306 may include, by way of example but not limitation, random access memory (RAM), such as dynamic RAM (DRAM) and static RAM (SRAM). The main memory 306 may be local, remote, or distributed. The main memory 306 may include computer-executable instructions 308.

The bus 330 may also couple the processor 302 to the non-volatile memory 310 and drive unit 322. The non-volatile memory 310 may often be a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may often be written, by a direct memory access process, into memory during execution of software in the computer system 400. The non-volatile storage may be local, remote, or distributed. The non-volatile memory 310 is optional because systems may be created with all applicable data available in memory. A typical computer system may usually include at least a processor 302, a memory 306, and a device (e.g., a bus 330) coupling the memory 306 to the processor 302.

Software may typically be stored in the non-volatile memory 310 and/or the drive unit 322. The drive unit 322 may include a machine-readable (storage) medium 324. The machine-readable (storage) medium 324 may include instructions 326. Indeed, for large programs, it may not even be possible to store the entire program in the memory 306. Nevertheless, it should be understood that for software to run, if necessary, it is moved to a computer-readable location appropriate for processing, and for illustrative purposes, that location is referred to as the memory 306. Even when software is moved to the memory for execution, the processor 302 may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor 302 is considered to be "configured to execute a program" when at least one value associated with the program is stored in a register readable by the processor 302.

The bus 330 may also couple the processor 302 to the network interface device 312 to communicate via one or more networks 314. The network interface device 312 may include one or more of a modem or network interface. It will be appreciated that a modem or network interface may be considered to be part of the computer system 400. The interface may include an analog modem, an integrated services digital network (ISDN) modem, a cable modem, a token ring interface, a satellite transmission interface (e.g., "direct IDC"), or other interfaces for coupling a computer system to other computer systems. The interface may include one or more input and/or output (I/O) devices (e.g., video display 316, alpha-numeric input device 318, cursor control device 320, etc.). The I/O devices may include, by way of example but not limitation, a keyboard, a mouse or other pointing device, a gesture control and/or detection device, an eye movement control and/or detection device, disk drives, printers, a scanner, and other input and/or output devices, including a video display device 316. The video display device 316 may include, by way of example but not limitation, a cathode ray tube (CRT), a liquid crystal display (LCD), or some other applicable known or convenient display device. For simplicity, it is assumed that controllers of any devices not depicted in the example of FIG. 4 reside in the interface.

In operation, the computer system 400 may be controlled by operating system software that includes a file management system, such as a disk operating system. The file management system may typically be stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated (e.g., by signal generation device 328). It has proven convenient at times, principally for reasons of common usage, to refer to these signals as bits, values, elements, symbols, characters, terms, numbers, or the like.

Example Architecture for Client Device

Figure 5:
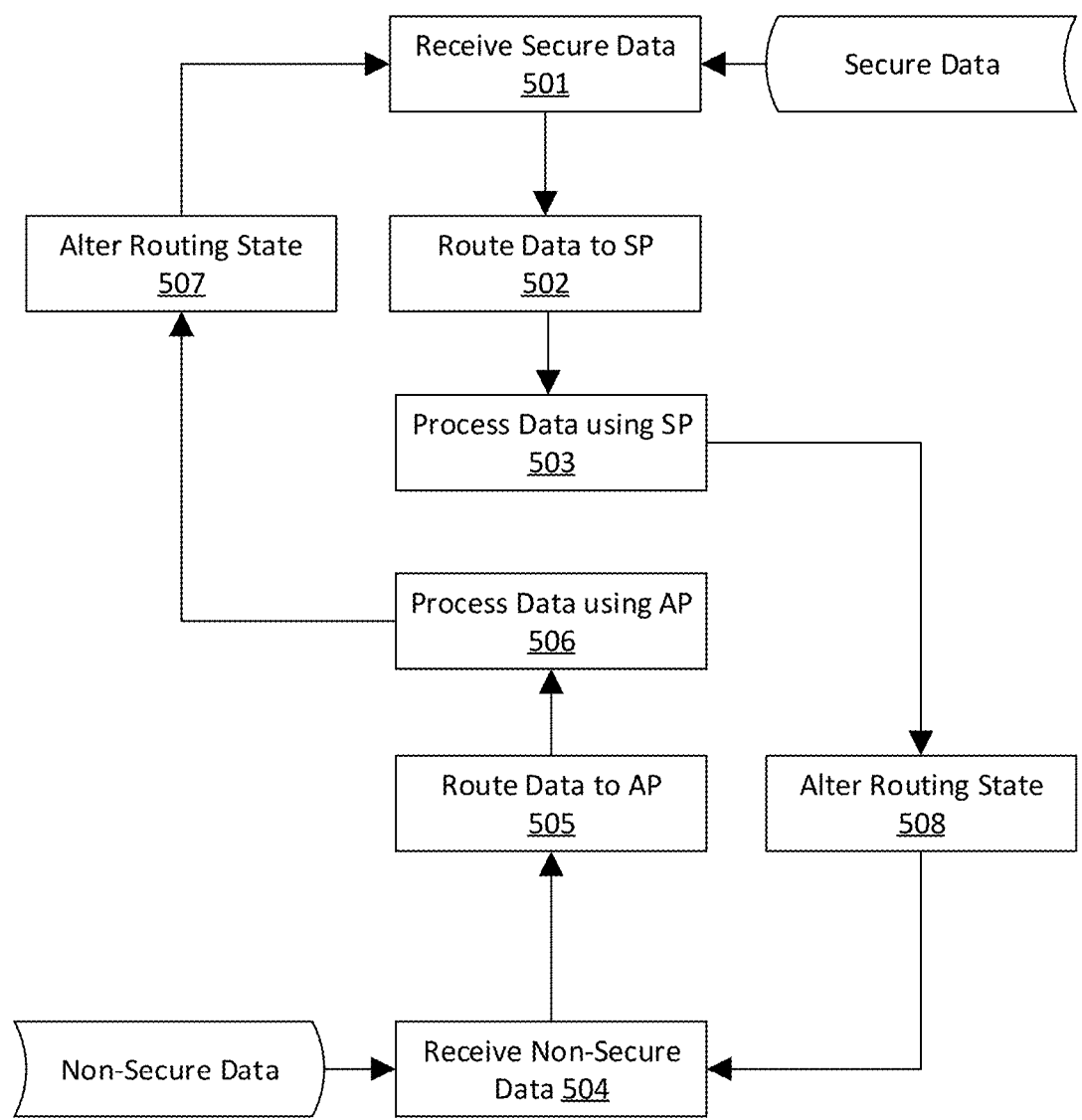
FIG. 5 illustrates a flow diagram of an example method for operating a secure POS platform in accordance with one or more example embodiments.

FIG. 5 is a flow diagram of a method 500 for operating a client device on a secure POS platform. Method 500 can begin with step 501 in which secure data is received from a user via an input device. An example of step 501 could be a user 110 entering sensitive payment information on the touch screen of a point of sale terminal. This data, which could be in the form of coordinates that describe a touch interaction with a touch display, would be received by a touch controller such as input device controller 102. As another example of step 501, a user 110 could enter similar information via other means such as a voice activated interface or standard key pad. Method 500 continues with step 502, in which the secure data is routed to a secure processor using a hardware multiplexer, and step 503, in which the secure data is processed by the secure processor. As an example based on FIG. 1, the payment information received in step 501 could be routed to SP 106 by MUX 104, and then processed by SP 106. The mode in which client device 120 operates while routing data to SP 106 can be referred to as the secure mode.

Method 500 also includes steps that describe how the device operates in the normal or non-secure mode. In step 504, non-secure data is received from a user via an input device. An example of step 504 could be a user 110 entering a quantity of items to purchase using client device 120. In step 505, this data is routed to a second processor using the hardware multiplexer. The second processor could be AP 108. In step 506, the non-secure data is processed using the second processor.

The non-secure mode and secure mode differ in terms of which processor data is routed to for processing. With reference to the system in FIG. 1, the routing state of MUX 104 sets which processor the data is routed to. In turn, the routing state of MUX 104 can only be controlled by SP 106. As such, when client device 120 is switched to operate in either mode, SP 106 can conduct either of steps 507 and 508 in which the routing state of the hardware multiplexer is altered. SP 106 will generally alter the routing state prior to the receipt of information from the user input device in order to match the mode of operation to the type of information being received.

Figure 6:
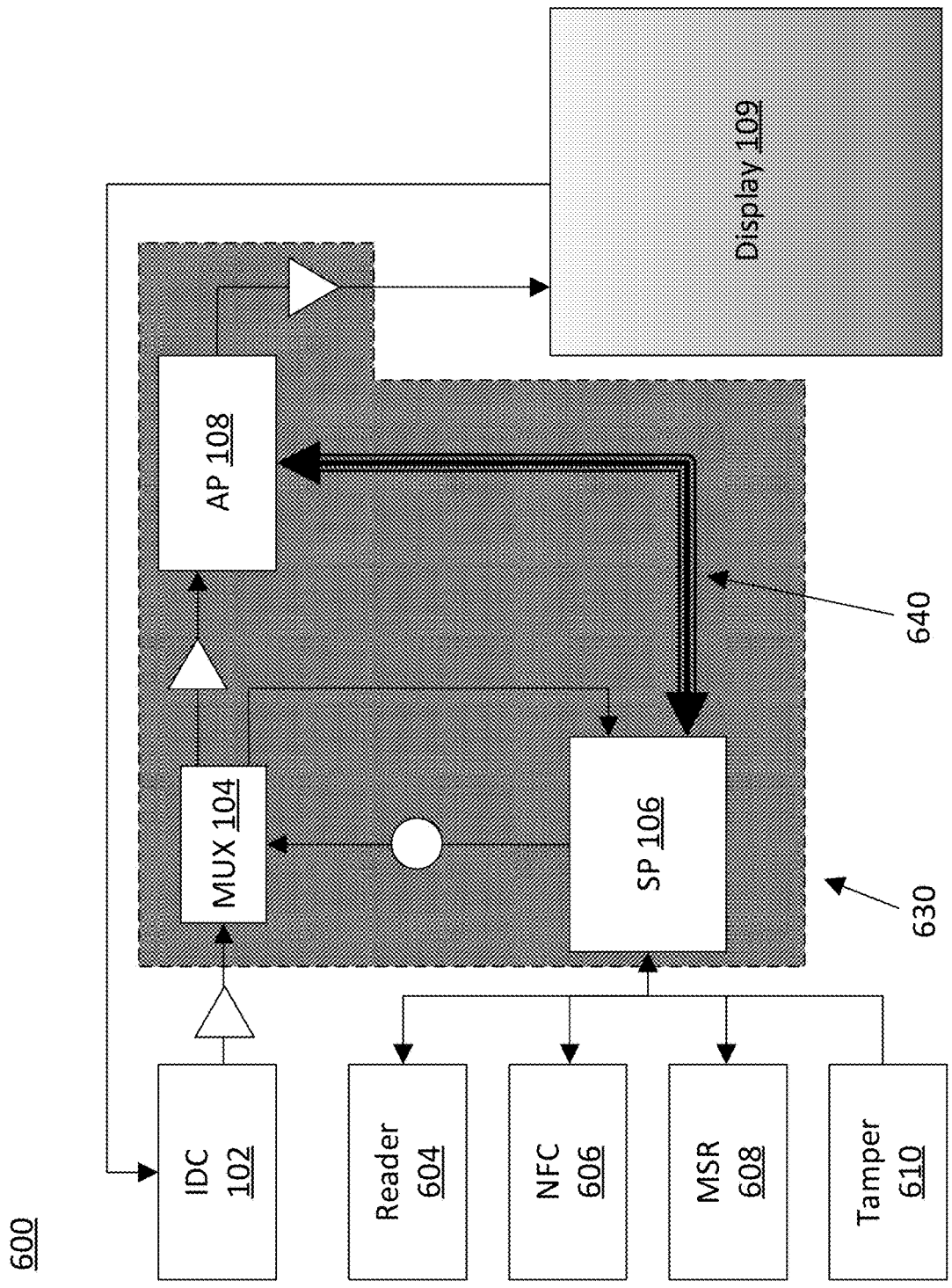
FIG. 6 illustrates a diagram of an example client device for a secure POS platform operating in a non-secure mode in accordance with one or more example embodiments.
Figure 7:
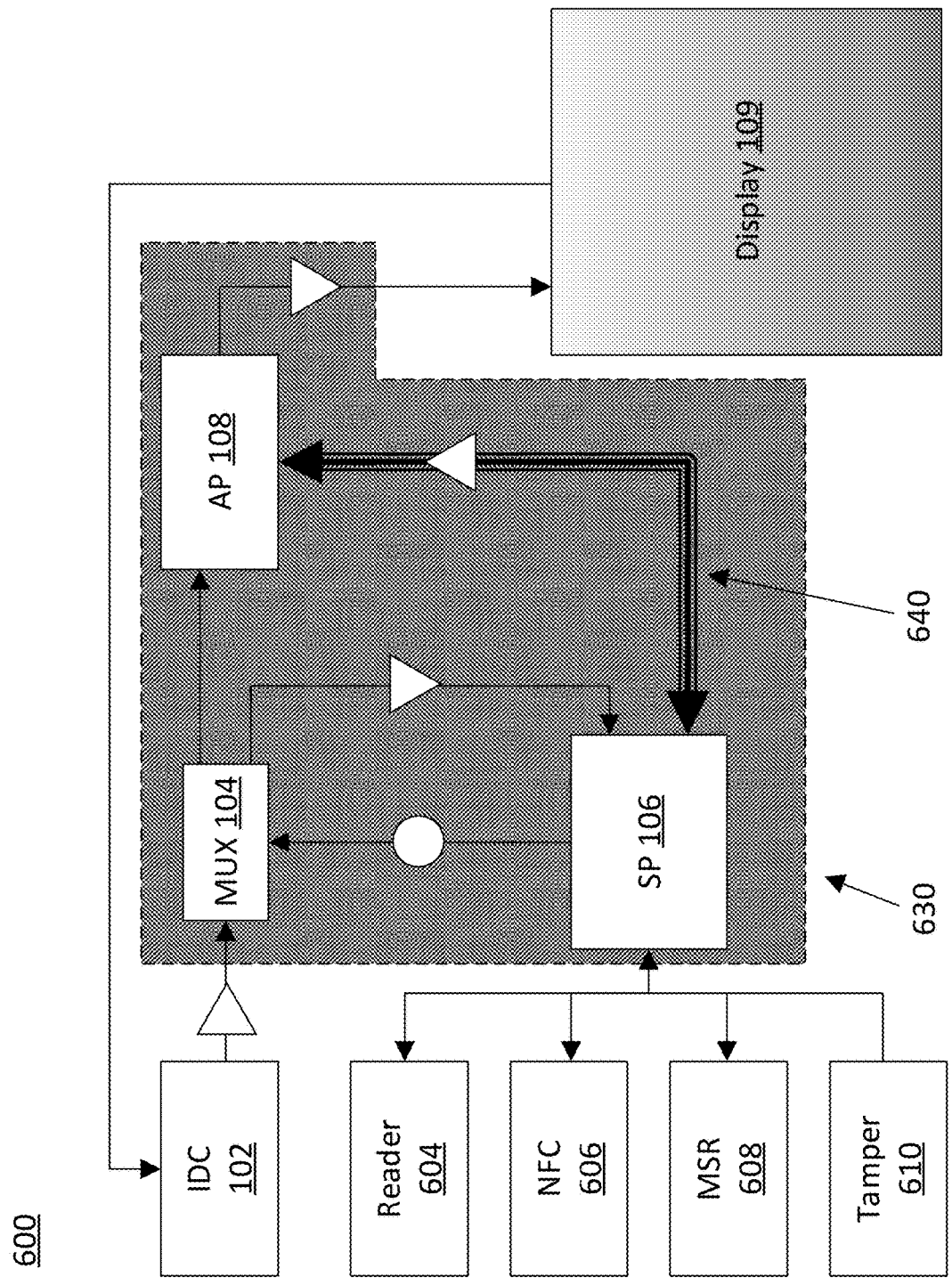
FIG. 7 illustrates a diagram of an example client device for a secure POS platform operating in a secure mode in accordance with one or more example embodiments.
Figure 8A:
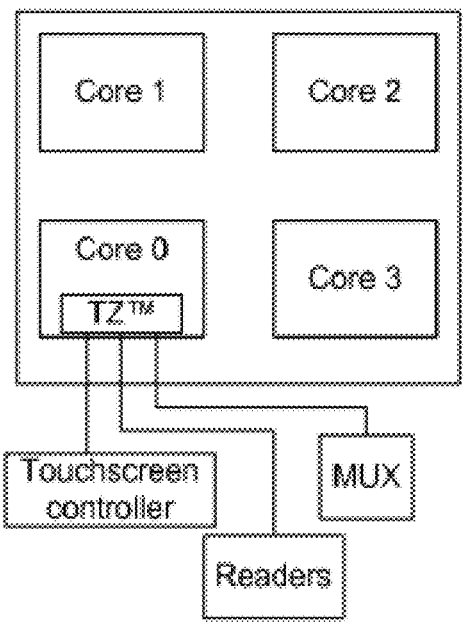
FIGS. 8A-8D illustrate diagrams of example device architectures for client devices for a secure POS platform in accordance with one or more example embodiments.
Figure 8B:
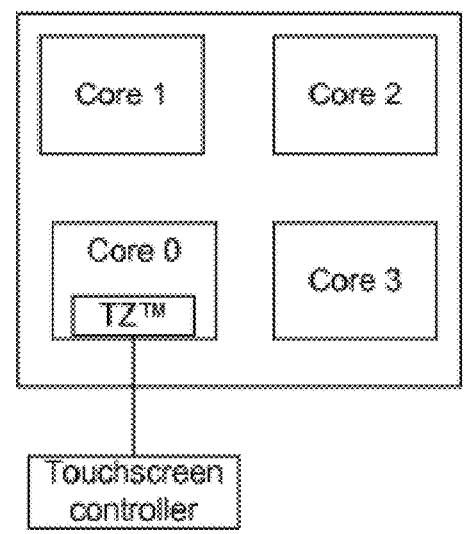
Figure 8C:
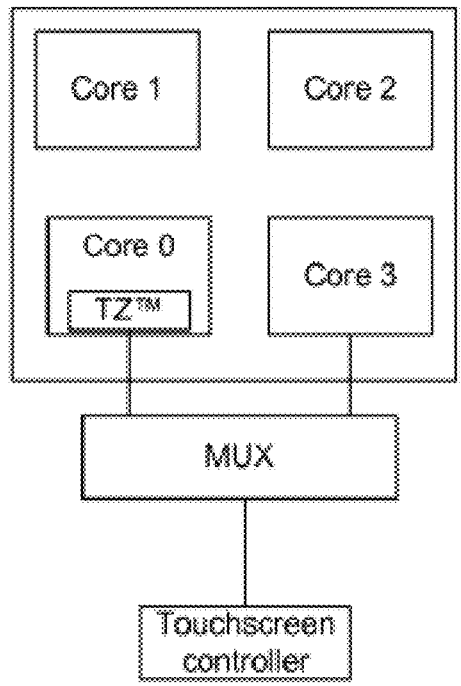
Figure 8D:
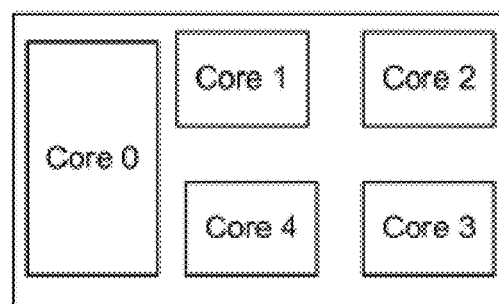

FIGS. 6 and 7 illustrate a particular implementation of client device 120 described in FIG. 1 and include communication lines that have been annotated to illustrate the effect of the routing state of MUX 104 on the routing of data through the architecture. The particular implementation can be referred to separately as device 600. In the state illustrated by FIG. 6, device 600 is operating in non-secure mode. In the state illustrated by FIG. 7, device 600 is operating in secure mode. Active data lines in each figure have been annotated with white arrows to show the direction of data flow. Active control lines in each figure have been annotated with white circles.

Device 600 is capable of receiving user data from at least one input device. IDC 102 includes an input device user data connection to receive that data from an input device. As illustrated, IDC 102 is a touch screen controller which receives touch data from touch display 109. Device 600 also includes a set of additional input devices with additional input device user data connections. Any input device that handles secure data can be substituted in place of these additional devices. However, an exemplary set includes a chip reader 604, a near field communication (NFC) device 606, a magnetic swipe reader (MSR) 608, and a tamper sensor 610. The chip readers 604 may be configured to check one or more embedded microchips in a credit card or debit card or any other card that may contain readable information. The NFC device 606 may be configured to activate the client device 120 by touch or by proximity through a touch sensitive handle on the client device 120 or by detecting an NFC device within certain proximity of client device 120.

Device 600 also includes computing device 630 which includes multiplexer 104, SP 106, and a second processor. In the illustrated example, the second processor is AP 108. The multiplexer 104 includes a multiplexer control input port communicatively coupled to a control output port on SP 106, a multiplexer data input port communicatively coupled to IDC 102, a first data output port communicatively coupled to a secure processor data input port on SP 106, and a second data output port communicatively coupled to a second processor data input port on AP 108. SP 106 and AP 108 are connected by bus 640. The elements of computing device 630 and the other components in device 600 are communicatively coupled in that information can be transmitted from one component and coherently received by the other component without intermittent alteration of that information. For the avoidance of doubt, information is not altered by standard signal conditioning or the application of CODECs that preserve the actual informational content of the signal. The term port is used here as it is used by those of skill in the art in the field of electronic communication and can encompass the pins of an integrated circuit, a via within an integrated circuit, a connection on a printed circuit board, or any other node in a circuit schematic.

The data lines that connect IDC 102 to MUX 104, MUX 104 to SP 106, and MUX 104 to AP 108 can comprise any communication interface such as I2C, SPI, USB, or equivalents along with any interrupts required by the peripheral controlled by IDC 102. Bus 640 between SP 106 and AP 108 can include any communication interface such as I2C, SPI, USB, UART, or equivalents. The number of interrupts required on bus 640 will vary depending upon the application as will be apparent to those of ordinary skill upon obtaining an understanding of the following disclosure.

MUX 104 is configurable between a first state and a second state. The first state corresponds to the secure mode of operation for device 600 and is illustrated in FIG. 7. The second state corresponds to the non-secure mode of operation for device 600 and is illustrated in FIG. 6. Examples of a secure operation may include entering a PIN used for cardholder verification, or entering a payment card number or verification code. Examples of non-secure transactions may include entering orders, entering a ZIP code, etc. When the current state of the multiplexer is the second state, the multiplexer data input port is communicatively coupled to the second data output port through the multiplexer. As seen in FIG. 6, this causes data to flow from IDC 102 through MUX 104 to AP 108. When the current state of the multiplexer is in the first state, the multiplexer data input port is communicatively coupled to the first data output port. As seen in FIG. 7, this will cause data to flow from IDC 102 through MUX 104 to SP 106. In both figures, the line connecting the control output port of SP 106 to the control input port of MUX 104 is emphasized using a white circle to note that the current state of MUX 104 is set by SP 106.

SP 106 has a direct connection to the set of second input devices in addition to that through IDC 102 and MUX 104. As illustrated, this set includes reader 604, NFC 606, MSR 608, and tamper sensor 610. SP 106 is communicatively coupled with a second input device in this set of second input devices via a second input device user data connection and a second data input port on SP 106. The connection is direct in that the devices are communicatively coupled with the secure processor 106 via the second input device user data connection and second data input port and not via MUX 104. In approaches in which SP 106 and MUX 104 are implemented on a single IC, the second data input port could be a second input pin on the IC in addition to the first data input pin that leads to the data input of MUX 104.

The current state of MUX 104 is exclusively controlled by SP 106 via the control output port of SP 106. In this regard, and with reference to FIG. 3, SP 106 can implement the functionality of security module 224. AP 108 can communicate with SP 106 along an inter-processor line which forms part of bus 640. AP 108 can utilize this line to indirectly affect the current state of MUX 104. For example, AP 108 can inform SP 106 that a user has requested a screen on display 109 for the entry of secure information. In response, SP 106 can choose to alter the routing state of MUX 104 and put device 600 into the secure mode of operation. In this example, AP 108 is only providing a request to transfer the state of MUX 104 and it does not control the state of MUX 104 directly. Also, once SP 106 takes control of MUX 104, SP 106 can be placed into a state in which it will not respond to any interrupts from AP 108 or other devices and will only relinquish control of the device and change the state of MUX 104 back when its own internal logic determines that such a change is necessary. This architecture thereby provides a high degree of control to SP 106 at the expense of AP 108. As a result, less secure programs can be installed on the device and run on AP 108 while a high level of security is still provided by SP 106.

The architecture illustrated in FIGS. 6 and 7 provides an additional benefit besides security in that IDC 102 can operate without regard to the state of computing device 630. In other words, a state machine that describes IDC 102 does not require information regarding whether or not device 600 is operating in the secure mode or the non-secure mode or information regarding the routing state of MUX 104. As shown in FIG. 6, when the device is operating in the non-secure mode, data will be passed through MUX 104 to AP 108. As shown in FIG. 7, when the device is operating in the secure mode, data will be passed through MUX 104 to SP 106. As long as SP 106 is configured to respond to data from IDC 102 in the same way that AP 108 does, IDC 102 will not need to know which processor is actually receiving the data it sends to computing device 630. As a result, steps 502 and 505 can both be preceded by identical pre-processing steps in which the data is pre-processed using IDC 102 in the same manner regardless of the state of MUX 104. Also, since AP 108 can be a standard applications processor, IDC 102 can also be an off the shelf user input device controller such as a standard touch display controller.

FIG. 6 and FIG. 7 include emphasized data lines that continue through the processors to display 109. In the secure mode of FIG. 7, data travels from SP 106 through inter-processor communication line 640 to AP 108 and then on through a display signal connection line to display 109. In the non-secure mode of FIG. 6, data travels from AP 108 through the display connection line to display 109. As a result, in either mode of operation AP 108 is the sole processor that display 109 needs to interact with. However, in the secure mode, SP 106 is controlling display 109 via a channel that comprises the inter-processor communication line 640 and display signal connection line.

SP 106 may apply one or more security algorithms (e.g., encryption) to protect subsequent outputs from the SP 106. Indeed, this may be one of the main components of the processing steps conducted by SP 106. Conducting encryption using SP 106 can provide device 600 with certain advantageous characteristics in that the crypto keys used to encrypt the information can be solely accessible to SP 106 and therefore isolated from AP 108.

The encryption can be conducted by an encryption module instantiated by SP 106 and a memory to which SP 106 has access. The encryption module can encrypt a quantum of data received from IDC 120 to create an encrypted quantum of data that is stored in that memory. The encryption module can also encrypt a quantum of data received from another input to the device such as MSR 608 or other input devices. The secure data entered on device 600 can be encrypted in real time as it is received or in bulk when the data is ready for transmission. SP 106 will have access to a network connection in order to send off secure data for verification. For example, SP 106 will be able to encrypt credit card information in order to receive an authorization for a charge against a credit card account.

The transferred data can be sent through AP 108 and then on to a network connection. In these situations, the encrypted quanta of data can be sent along an inter-processor line on bus 640. Since the data is in encrypted form, it is safe to be handled by AP 108, and the actual network connection does not need to interface with SP 106. However, in certain approaches SP 106 will have an isolated network connection to send out authorization information and receive confirmation of authorization.

In a POS application, SP 106 can conduct numerous additional secure features in addition to handling secure data and controlling when the state of MUX 104 should be altered. For example, SP 106 can run tamper sensors, such as tamper sensor 610, to determine when a physical attack has taken place on a device and destroy any sensitive information upon detection of an attack. SP 106 can also run code to conduct contact and contactless payments, and perform crypto operations required by the kernels of such payments, and protect private keys used in the payment processing infrastructure.

The actual hardware implementation of SP 106 and AP 108 can vary in terms of the isolation between the devices. As will be described below, SP 106 and AP 108 can be implemented on the same physical processor. However, in certain embodiments, SP 106 and AP 108 can be independent microcontrollers. SP 106 and AP 108 can also be independently associated with first and second memories that are distinct and separate hardware components. The first memory can be associated with the operation of SP 106 and the second memory can be associated with the operation of AP 108. To ensure the security of SP 106, AP 108 may be incapable of addressing the first memory. As such, attacks that attempt to illicitly enter instructions for execution by SP 106 or access data utilized by SP 106 using AP 108 will not be physically possible. The independent microcontrollers may include multiple processing cores but the overall device will still be referred to herein as a processor.

One or more of the components in computing device 630 may exist on the same chip or a combination of the components may be on the chip, examples of which can be discussed with reference to FIGS. 8A-8D. For example, MUX 104 and SP 106 could be implemented on a single integrated circuit while AP 108 and IDC 102 were left as standalone devices. In that IC, MUX 104 could be a block of circuitry on the IC, and SP 106 could include an encryption circuit configured to conduct the encryption operations for SP 106. In these approaches, the control output port of SP 106 and the control input of MUX 104 would be connected via interconnects in that single integrated circuit. In addition, the multiplexer data input port would be communicatively coupled to an input pin on the IC and the second multiplexer data output port (i.e., the one that is communicatively coupled to AP 108) would be communicatively coupled to an output pin on the IC. The pins on the IC could be solder bumps, copper posts, or any other IC packaging connection technology. As another example, and referring to FIGS. 8A-8D, SP 106 and AP 108 may coexist on one multi-core processor, while MUX 104 may be a standalone device. One or more devices such IDC 102, chip reader 604, NFC 606, MSR 608 and tamper sensor 610 may be accessible from the TrustZone™ of one of the cores of the multi-core processor. In order to access one or more of these devices, an application may need to go through the TrustZone™ of the dedicate core.

In another embodiment, one core of a multi-core processor may be designated to function as SP 106 and another core to function as AP 108, while both of these cores may be connected directly to the MUX 104. Further, the IDC 102 may be connected to MUX 104. In that scenario, the IDC 102 may be isolated from both SP 106 and the AP 108. In one embodiment the TrustZone™ portion of the SP 106 core may determine whether the data passing through MUX 104 may go through SP 106 core or AP 108.

In another embodiment, a multi-core processor may not contain the TrustZone™ technology but instead rely on the physical security on the chip, such as, a secure mesh that protects the cores from tampering. It is understood that a multi-core processor may include any number of cores and not limited by the examples of FIGS. 8A-8D.

In one embodiment, the IDC 102 may be connected directly to a TrustZone™ area of a processor or a core of a multi-core processor. In this scenario, the core that includes the TrustZone™ may be always dedicated as a secure core that handles secure and normal (non-secure) transactions.

In one embodiment, it may not be necessary to have a MUX 104 included in the computing device 630. For example, in scenarios where a core of a multi-core processor is dedicated to be a secure microcontroller with a TrustZone™, and a IDC 102 may be connected through the TrustZone™ the TrustZone™ may decide whether to switch between secure and non-secure transactions based on the touches received from user 110 on client device 120.

Example Mode Transitions and Transaction Processing

Client device 120 can alternate between secure mode and the non-secure mode in various ways. After transitioning into secure mode, secure transactions can be conducted by SP 106 including reading data from display 109, reader 604, NFC 606, or MSR 608, encrypting that data, transmitting the data for authorization at a remote server, instantiating a virtual keypad on display 109, and other secure actions. After the secure transactions have been conducted, SP 106 will then relinquish control of client device 120 and then alter the state of client device 120 back to the non-secure mode.

SP 106 alters the state of MUX 104 to alternate the device between a secure mode and a non-secure mode. As mentioned previously, SP 106 has exclusive control over the state of MUX 104. However, given the particular architecture of the client device as described herein, there is no need for an additional interrupt line or special secure firmware on IDC 102 or AP 108 in order to enforce the secure mode of operation. Bus 640 will include a data line on which AP 108 can indicate that user inputs on IDC 102 are requesting a secure mode, and SP 106 can react to this information, but the manner in which access to the data from IDC 102 is provided is not burned into device 120. Instead, a dynamic runtime decision is made to decide which processor gets access to the input device. The decision is made entirely by SP 106, but can accommodate requests from any application running on AP 108 in a flexible manner. In addition, SP 106 can react directly to data received on a second input device without immediately interfering with the operation of AP 108. In specific approaches, this will also cause an interrupt to be sent on bus 640, but in these cases the interrupt will transfer from SP 106 to AP 108.

Figure 9:
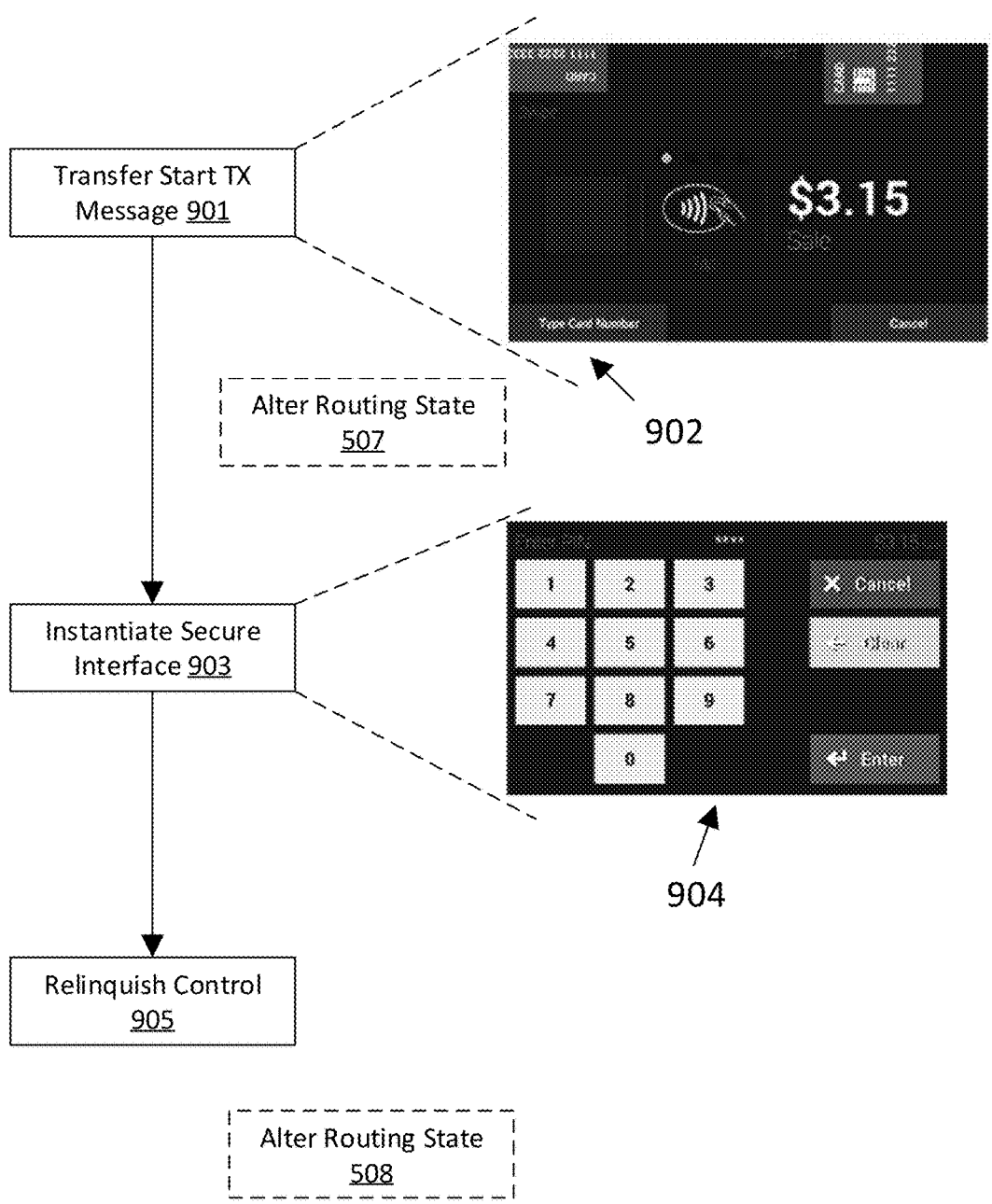
FIG. 9 illustrates a flow diagram of an example method for operating a secure POS platform in accordance with one or more example embodiments.

A set of methods in which a transition is made from the non-secure mode to the secure mode in response to a message sent by AP 108 can be described with reference to FIGS. 9-11. FIG. 9 illustrates a set of methods 900 that can be conducted by a client device 120 in the form of a POS terminal having the architecture of device 600. In these examples, device 600 can be a POS terminal with a touch display in place of display 109, and IDC 102 may be a touch screen controller configured to receive touch input from user 110 (e.g., a merchant or customer) operating client device 600.

In step 901, a start transaction ("TX") message is sent from AP 108 to SP 106 using an inter-processor line on bus 640. The start transaction message can be provided by the AP 108 in response to receiving an input from a user. The input could indicate that the user wants to initiate a payment transaction, in which case SP 106 would administrate the entire payment transaction. However, the input could also indicate that the user would like to enter a secure piece of information, in which case SP 106 would only administrate the entry of that secure piece of information. In the context of a secure piece of information being entered as part of an overall payment flow, AP 108 could then retain control of the device for the other steps in the payment flow besides the receipt of the secure information. In this sense the term "transaction" is referring to a secure transaction between the user of the device and the device itself, not a payment transaction that is being conducted using the device. In keeping with this later case, the input can be the selection of a button on the screen that indicates the user would like to enter a credit card number manually, enter a PIN number, enter a CVV number, or any other secure information. The specific example of a manual credit card number entry button 902 is provided in FIG. 9.

In step 903, the touch display is used to instantiate a secure interface. Prior to step 903, but after receiving the start transaction message, the routing state of MUX 104 can be altered as in step 507 of FIG. 5 under the control of SP 106. The secure interface will provide the user with the ability to view or enter secure information. For example, the secure interface could be a virtual keypad 904, an account selection interface, or an account information interface. Step 903 can be a sub-part of a larger process in which the SP 106 controls display 109 via the channel that includes the inter-processor line and the display drive line mentioned above. This channel can also include AP 108. As SP 106 controls display 109 in this step, and the data received in the secure mode is sent to SP 106, no programs associated with AP 108 will have access to the touch data entered on the keypad 904. In specific approaches, SP 106 will retain control of display 109 as the secure information is being entered so that it can display wild card characters while the user is entering the secure information.

Figure 10:
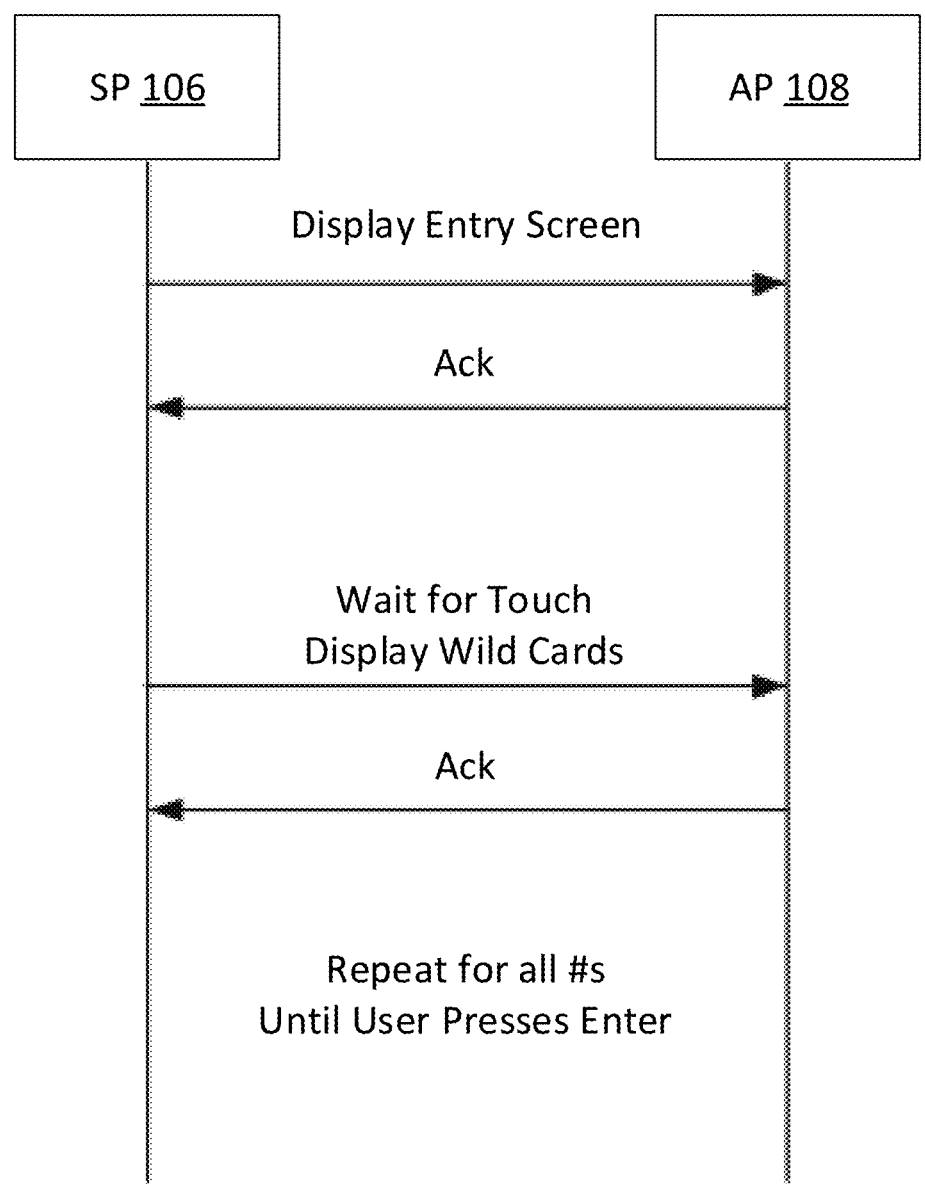
FIG. 10 illustrates a ladder diagram of communications between a secure processor and application processor for conducting a secure transaction that is in accordance with one or more example embodiments.

FIG. 10 provides a ladder diagram showing the communication between SP 106 and AP 108 during the execution of step 903 in approaches where the control channel includes AP 108. In one embodiment, while a user 110 is entering secure information on display 109, SP 106 may send a message to AP 108 instructing it to display a virtual keypad.

The AP 108 may carry out the instruction by communicating with display 109 of client device 120 and may respond (acknowledgement "Ack") to the SP 106 when the action is completed. SP 106 may receive one or more button touches on the touch screen and may convert one or more of the button touches to wild card characters (e.g., #, *, etc.). The AP 108 may respond to the SP 106 when the instructions are completed and the user 110 is presented with the characters (e.g., #, *, etc.). This process continues until user 110 presses a completion button, such as, "enter," "OK," etc.

After the secure data is entered, SP 106 can retain control of display 109 for a period of time while the secure data is processed. For example, SP 106 could retain control of the display while a PIN entered by the user is encrypted and transferred off of client device 120 for authorization as in step 905, when control is relinquished. The display could show a transaction processing screen to a user, and allow the user to exit secure mode by pressing a cancel button on the screen.

Alternative or additional secure transactions can be conducted in place of step 903 in FIG. 9. For example, the display of the virtual keypad could be combined with encryption of the received data and transmission of that data for authorization from a remote server. One of the secure transactions could be the activation and communication with one of the input devices in FIG. 6 besides display 109. This communication could be conducted independent of AP 108.

Figure 11:
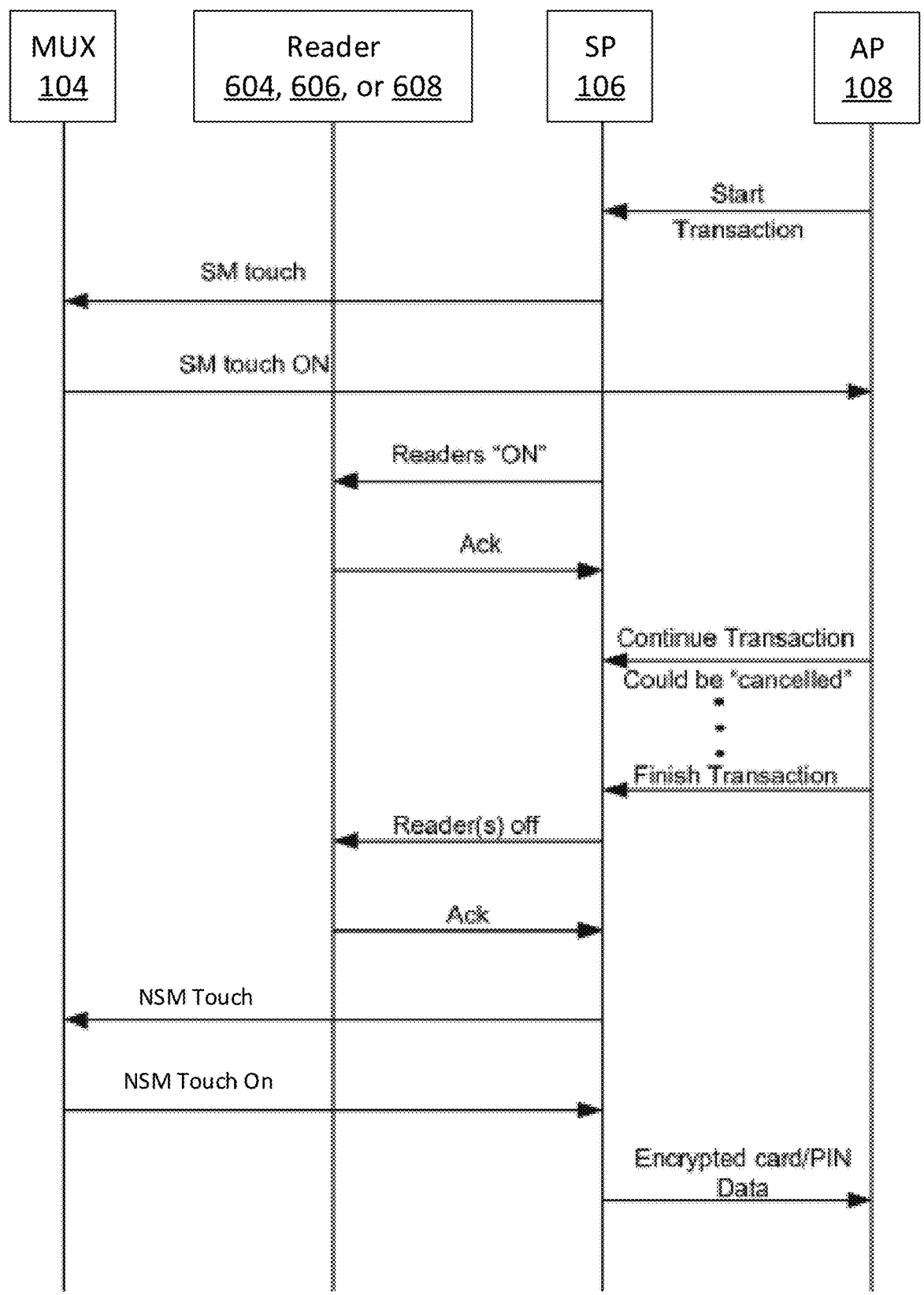
FIG. 11 illustrates another ladder diagram of communications between a secure processor, multiplexer, and second input device, for conducting a secure transaction that is in accordance with one or more example embodiments.
Figure 12:
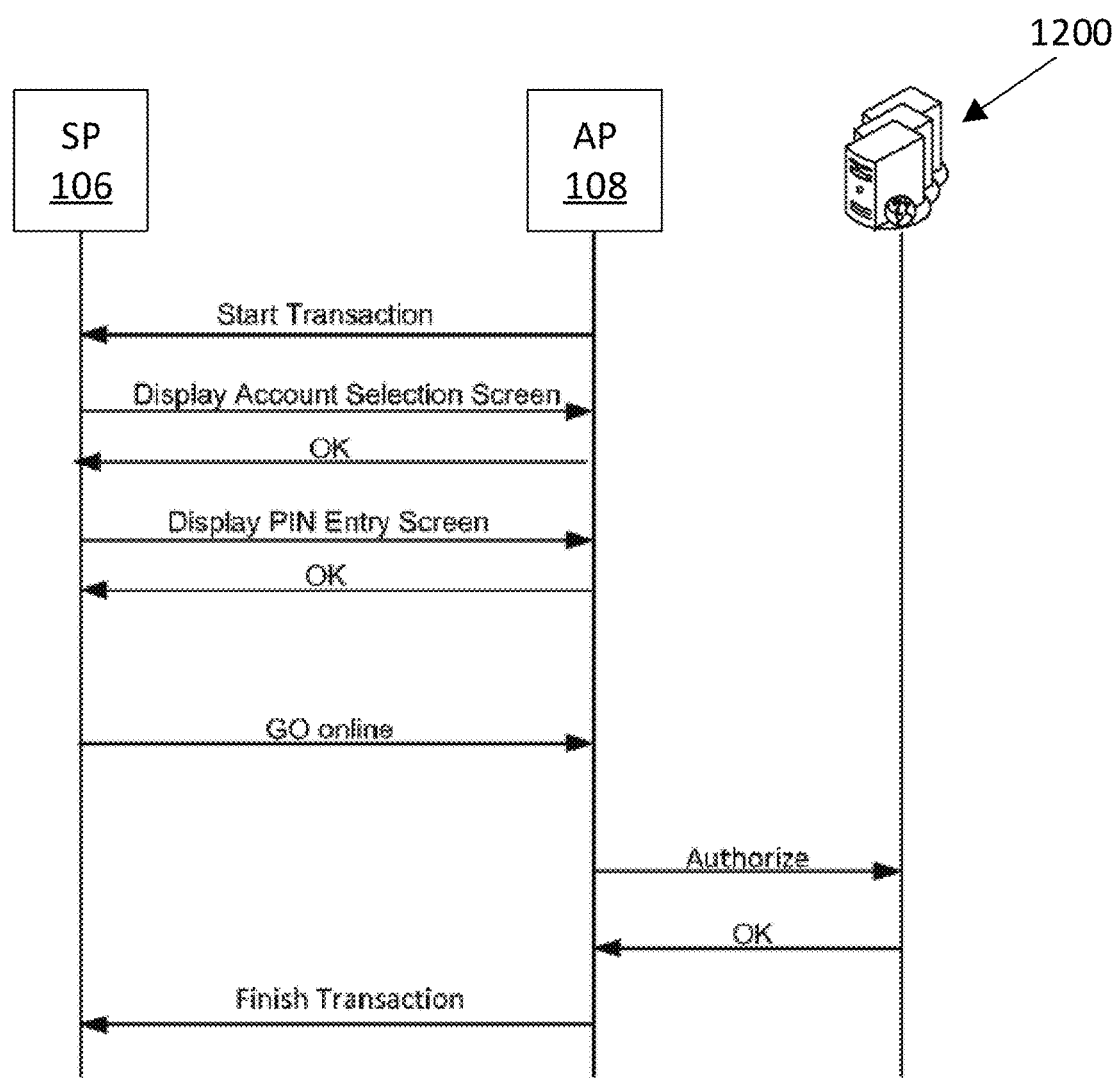
FIG. 12 illustrates another ladder diagram of communications between a secure processor, application processor, and server, for conducting a secure transaction that is in accordance with one or more example embodiments.

FIGS. 11 and 12 include ladder diagrams that show exemplary additional secure transactions that can be conducted along with step 903. The ladder diagrams show the exchange of information between the AP 108, SP 106, MUX 104, and other devices during the execution of these secure transactions. Both FIGS. 11 and 12 involve transactions where AP 108 initiates a request for the secure mode by sending a start transaction message to SP 106. However, the ladder diagrams differ in terms of what additional secure transactions are illustrated along with the receipt of secure data in secure mode.

In FIG. 11, the secure mode is activated and SP 106 takes control of display 109. However, SP 106 also activates reader 604, 606, or 608 (Readers "ON") in order to receive additional secure data via a second input device besides display 109. The additional secure data can be provided directly from readers 604, 606, or 608 to SP 106 such that it is not routed through MUX 104. The data can be received via a second data input port on SP 106 that is communicatively coupled with a user data connection providing data from the reader. SP 106 can then process the additional secure data by, for example, encrypting the secure data. The encrypted secure data can then be sent on to a remote server for authorization. As mentioned previously, SP 106 can send off the information via AP 108 as the data is in encrypted format. In FIG. 12, the secure mode is activated and SP 106 instructs AP 108 to display an account selection screen and PIN entry screen to receive secure information from a user in the form of a PIN and account. As illustrated in FIG. 12, the SP 106 can then instruct 108 to establish a network connection with a server 1200 in order to authorize the transaction by providing server 1200 with the secure data in encrypted form.

Device 600 will exit the secure mode under the control of SP 106 when SP 106 relinquishes control of display 109 as in step 806. Control can be relinquished before or after additional secure transactions are conducted. For example, as in the ladder diagram in FIG. 11, control can be relinquished prior to encrypting the data for transmission. As long as display 109 is not being used to input secure information, SP 106 can relinquish control of the display to AP 108. Once control is relinquished, SP 106 will alter the routing state of MUX 104 as in step 508.

Figure 13:
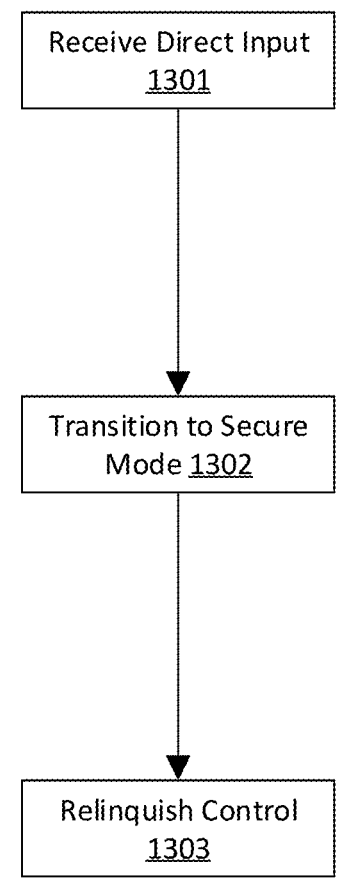
FIG. 13 illustrates another flow diagram of an example method for operating a secure POS platform in accordance with one or more example embodiments.

In some approaches, SP 106 will force the device into the secure mode without receiving a prompt from AP 108. As illustrated in flow chart 1300 of FIG. 13, SP 106 could receive a direct communication from a second input device such as reader 604, NFC 606, MSR 608, or tamper sensor 610 as in step 1301. In step 1301, a user of client device 120 may initiate a secure transaction without first prompting the device using IDC 120 and instead using a second user input device. For example, if a secure transaction and/or operation is performed by a merchant (e.g., user 110), such as, card swipe, insertion of a payment card, etc., the appropriate system (e.g., chip reader 604, or NFC 606, or MSR 608, or tamper sensor 610) may be triggered. With specific reference to a POS terminal with a touch display and NFC reader, this kind of secure transaction could be initiated via the unprompted introduction of an NFC device into close proximity with the POS terminal.

In step 1302, SP 106 could issue a hardware interrupt to AP 108 to initiate a secure transaction and put the device into secure mode. Continuing the above example, depending on the token used to provide the direct input (e.g., debit card, credit card, or chip card) the SP 106 may be able to determine whether to instantiate a virtual keypad, account selection, or account information screen on the display of the device. If SP 106 determines that the entry of secure information is required, the routing state of MUX 104 could be altered to protect the secure information. As another example, SP 106 could receive a tamper indication in step 1301 and transfer the device into secure mode in 1302 to lock out the device. At that point, SP 106 could continue a secure transaction such as erasing any crypto keys stored on the device. After the secure transaction or transactions were complete, SP 106 could relinquish control in step 1303 and the device could return to non-secure mode.

Exemplary Encryption Methods

Figure 14:
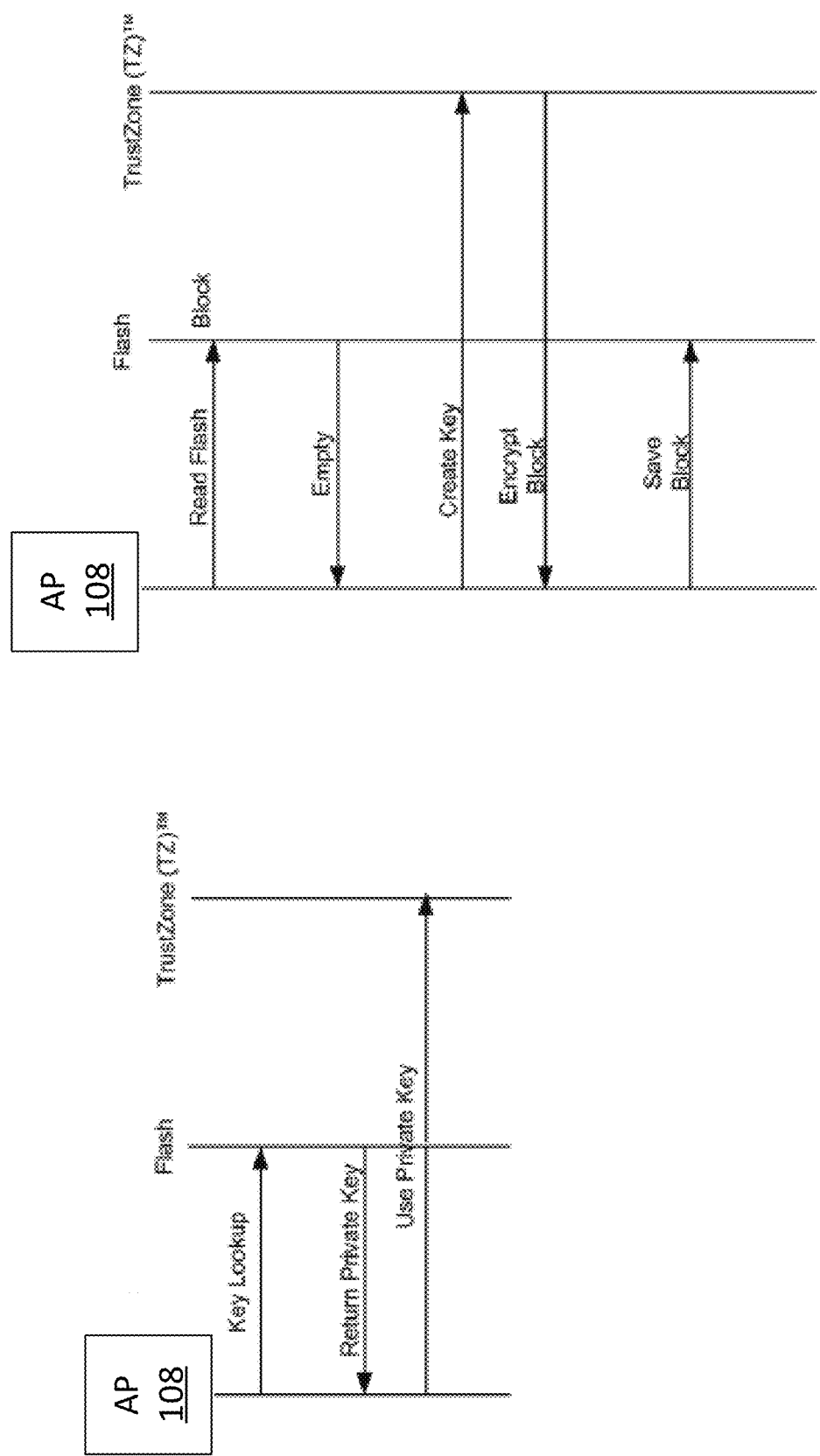
FIG. 14 illustrates another ladder diagram of communications for operating a secure POS platform in accordance with one or more example embodiments.

FIG. 14 illustrates another flow diagram of an example method for operating a secure POS platform in accordance with one or more example embodiments. The description is provided with reference to AP 108 conducting the transaction; however, in certain approaches SP 106 will be able to conduct these operations directly. In one embodiment, the AP 108 may send secure information to the server. The secure information may be a result of the secure transaction conducted using SP 106. A certificate may need to be exchanged before the AP 108 may communicate with the server. The certificate may need to be signed by an authority associated with First Data Corporation of Atlanta Ga., such as root certification authority (e.g., Clover™). The certificate may be captured in one or more secure areas of the AP 108. For example, if the AP 108 contains a secure area, such as, TrustZone (TZ™), the TZ™ may contain an encrypted key (or private key) that may be unique for the AP 108 processor. In other approaches, the certificate will be stored in a memory that is only accessible to SP 106.

In one embodiment, the AP 108 may look up the flash to determine whether a private key exists. If one exists, the key may be used with the TZ™. However, if a key is not found, the flash may report that a block location is empty and that a key needs to be created. The TZ™ may encrypt the key and send it to the AP 108 that sends a request to the flash memory to save the key at the block location.

In one embodiment, the AP 108 may have a persistent identity that may be presented to the server. The persistent identity may be due to maintaining the same private key over factory resets and/or power failures.

In order for the private key to service reset or power failures, the private key may be written to a non-volatile flash area that may survive resets and/or power failures. The private key may be saved in a TZ™ area during initial installation of a client device 120 at a user premises. It is understood that TZ™ is a system for securing peripherals such as memory, crypto blocks, keyboard and displays to ensure they can be protected from software attacks.

In one embodiment, the SP 106 and the AP 108 may have a persistent identity to present to a server that may provide services or data to the SP 106 or AP 108. The persistent identity may be in the form of a digital public-key certificate (such as an X.509 certificate). The SP 106 and AP 108 may authenticate themselves to a server using either transport-level security (e.g., SSL/TLS) or message-level security (e.g., RSA signature over a message). The private key component may be protected by the SP 106 secure cryptographic device such that tampering with the device may erase the private key, or a master symmetric key. This may provide strong, cryptographic, persistent device-to-server authentication in such a way that devices may not be cloned and communications remain private and authentic.

This persistent, cryptographic identity may be used by SP 106 to obtain financial encryption keys remotely from the server, for example a triple DES key for use with the derived unique key per transaction (DUKPT) key management scheme, which is a standard in the electronic transactions industry. The persistent identity of the SP 106 and the AP 108 may help prevent against security attacks where a component of the client device 120 may have been compromised or hacked because the persistent identity may be encrypted and communicated between components within the client device 120 and/or outside the client device 120. In case of a malicious substitution of either the SP 106 or the AP 108 with other components, or a tamper event of the original components, the identity may not match which may render the client device 120 as compromised and may be inoperable. In one embodiment the SP 106 may implement a persistent identity by having a discrete battery for maintaining the private key or master symmetric key.

In one embodiment, the SP 106 and the AP 108 may have persistent identities that work as a pair. For example, each pair of SP 106 and AP 108 may be bonded by the pair of keys that define their persistent identity. In that sense, mixing various SP 106 and AP 108 that may not have been bonded together as a pair, may render the client device 120 inoperable. Therefore, only bonded pairs of SP 106 and AP 108 may function together in a client device 120.

In one embodiment, a remote key injection may be implemented on the SP 106 and/or the AP 108. For example, the SP 106 and/or the AP 108 may be placed in a secure room, containing a certificate authority. The certificate authority may sign a certificate signing request from the SP 106 or AP 108, thus providing the device with its persistent identity.

In one embodiment, a key may be injected in the SP 106 and/or the AP 108. During manufacturing of semiconductor components, a process for injecting keys is typically done inside of a key injection room with an injection device. A key may be generated by placing the SP 106 and/or the AP 108 in a secure room and injecting the key into the SP 106 and/or the AP 108 by a key injection device.

In one embodiment, bonding of the SP 106 and the AP 108 may be performed at the same time as signing the public key certificates. The purpose is to provide additional security against tampering and component swapping between devices.

Exemplary Physical Security Measures

As stated previously SP 106 may be in direct communication with a tamper sensor 610 that may be activated in case of a determination of tampering, such as unauthorized attempt to access the client device 120. The tamper sensor can be connected to several tamper detection points including a detection point on a tamper resistant cover for client device 120. The tamper resistant cover may be in keeping with the cover in FIG. 15 which shows an upper view of an exemplary cover for client device 120.

Cover 1502 may obscure or otherwise protect certain areas of an associated printed circuit board 1504 of a POS device or client device, such as client device 120, which may be the target of third-party tampering. The cover 1502 can include any number of other physical security devices, techniques, and/or technologies to prevent, inhibit, or otherwise deter third-party tampering.

Figure 15:
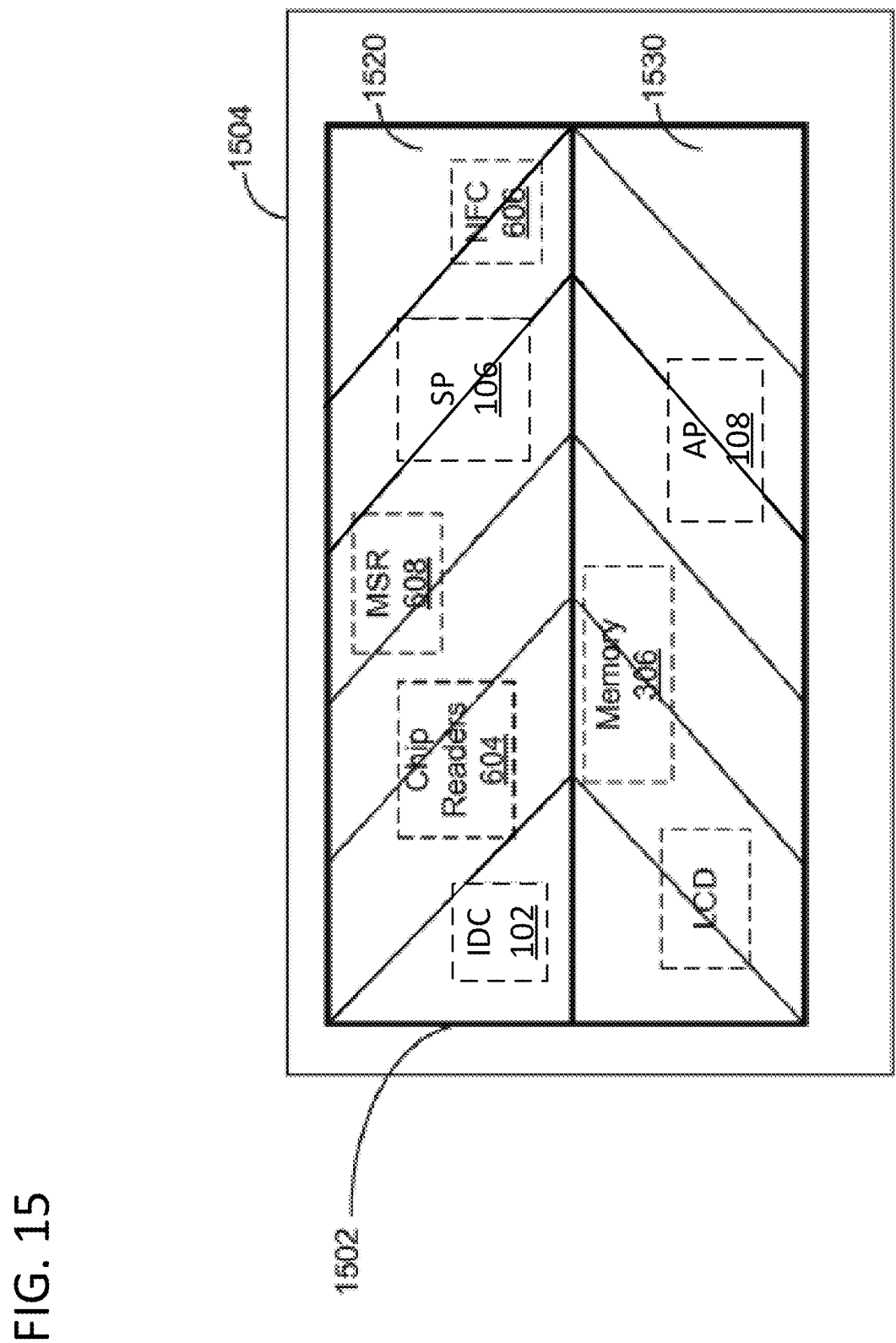
FIG. 15 illustrates an upper view of an example cover for a POS or client device in accordance with one or more example embodiments.

As shown in FIG. 15, the cover 1502 may be a relatively rigid structure with a predefined shape or configuration mounted to one or more areas of the printed circuit board 1504. The cover 1502 may be mounted to the printed circuit board 1504 by way of any number of physical connectors, soldering, adhesives, etc.

Further, the cover 1502 can include one or more physical security devices, techniques, and/or technologies. In one embodiment, the cover 1502 may include special traces that may be molded on or in the plastic. In one embodiment, the cover 1502 may contain one or more break channels embedded on the cover 1502 to deter tampering if the cover is attempted to be removed. For example, if an attempt was made to remove the cover 1502, one or more break channels may disconnect the cover 1502 from the printed circuit board 1504 rendering the associated client device 120 or POS device inoperable by way of one or more signals generated by the client device 120 or POS device, and sent by the client device 120 or POS device to a remote server, such as a Clover™ server operated by First Data Corporation of Atlanta, Ga. In one embodiment, the cover 1502 may be a laser direct structuring (LDS) or other printed circuit with traces that may have certain predefined heat tolerance and/or resistance, flexibility, and/or strength characteristics. For example, the cover 1502 may have a predefined heat tolerance that may be relatively higher than the heat tolerance of one or more components of the client device 120 or POS device that are being obscured or otherwise protected by the cover 1502. Having a relatively higher heat tolerance than one or more components of the client device 120 or POS device may provide additional security against third-party tampering since exposing the cover 1502 to a temperature above the heat tolerance of one or more components of the client device 120 or POS device may render the one or more components inoperable and ultimately cause failure of or otherwise render inoperable certain functionality or features of the client device 120 or POS device. Similarly, the cover 1502 may have a relatively low flexibility tolerance to prevent flexing the cover 1502 beyond a predefined point of breakage. That is, the cover 1502 may break rather than flex, when the cover 1502 is flexed beyond a certain point. Breaking the cover 1502 may render the client device 120 or POS device inoperable by way of the client device 120 or POS device generating one or more signals, and sending the signals to a remote server, such as a Clover™ server operated by First Data Corporation of Atlanta, Ga.

In another embodiment, the cover 1502 may include one or more zones that may each have one or more respective layers of physical security. In some embodiments, the cover 1502 may have a relatively high strength factor that prevents, inhibits, or deters drilling or applying other forces to the cover 1502 to attempt to access the one or more components of the client device 120 or POS device.

For example, the cover 1502 may be divided into two zones (e.g., zones 1520 and 1530). The division of the zones may be based on what components of the printed circuit board 1504 are covered by that zone. Further, the zones may contain various layers of physical security, again, based on what components of the printed circuit board 1504 are covered by that zone. For example, zone 1520 may cover the IDC 102, the SP 106, the NFC 606, the MSR 608, and the chip readers 604. The IDC 102, the SP 106, the NFC 606, the MSR 608, and the chip readers 604 may be considered as sensitive components that may require additional security protection against tampering. A malicious access to one or more of these components may expose sensitive information and may provide access to secure data. Therefore, zone 1520 may contain one or more layers of security to prevent against malicious access. Zone 1530 may cover AP 108, memory 306, and the LCD device driver. Since these components may not contain sensitive data where a malicious access may not severely impact the client device 120, the zone 1530 may contain less layers of security than the zone 1520. It is understood that the above is only an example of division between two zones and that other divisions between one or more zones may be implemented based on the security need for the client device 120.

CONCLUSION

The operations and processes described and shown above may be carried out or performed in any suitable order as desired in various implementations. Additionally, in certain implementations, at least a portion of the operations may be carried out in parallel.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although a majority of the application was directed specifically to devices with touch screens, the methods devices and systems disclosed above can be utilized on any terminal that receives secure information and non-secure information. These and other modifications and variations to the present invention may be practiced by those skilled in the art, without departing from the scope of the present invention, which is more particularly set forth in the appended claims.

What is claimed is:

1. A method comprising:
    injecting a first public key into a secure processor;
    signing a certificate signing request from the secure processor to generate a first public-key certificate;
    injecting a second public key into a second processor;
    signing a second certificate signing request from the second processor to generate a second public-key certificate;
    wherein the first public-key certificate and the second public-key certificate form a bonded pair of certificates; and
    wherein the bonded pair of certificates form a persistent identity for the secure processor and the second processor.

2. The method of claim 1, further comprising:
    receiving the first public-key certificate at a server;
    receiving the second public-key certificate at the server; and
    transmitting financial encryption keys from the server to a device in response to an authentication of the bonded pair of certificates.

3. The method of claim 2, wherein:
    the first public-key certificate and the second public-key certificate are transmitted using transport layer security.

4. The method of claim 1, wherein:
    the signing is conducted by a certificate authority; and
    the injecting is conducted in a key injection room.

5. The method of claim 1, wherein:
    the injecting is conducted via remote key injection.

6. The method of claim 1, wherein:
    the secure processor and the second processor are located in a point of sale device;
    the first public key is injected into a first memory;
    the first memory is associated with operation of the secure processor and integrated on a single integrated circuit with the secure processor; and
    the second processor does not have access to the first memory.

7. The method of claim 6, further comprising:
transmitting financial encryption keys from a server to the point of sale device in response to an authentication of the bonded pair of certificates; and
encrypting, on the secure processor and using the financial encryption keys, payment information received on the point of sale device.

8. The method of claim 6, wherein:
the secure processor and the second processor are discrete microcontrollers; and
the first public key is injected using remote key injection.

9. The method of claim 6, wherein:
the secure processor and the second processor are different cores on a multi-core processor.

10. The method of claim 1, further comprising:
authenticating the secure processor and the second processor to a server by sending the first public-key certificate and the second public-key certificate to the server; and
erasing a first memory if a tamper event is detected;
wherein the first public-key certificate is stored in the first memory.

11. The method of claim 1, further comprising:
authenticating the secure processor and the second processor to a server by sending the first public-key certificate and the second public-key certificate to the server; and
obtaining financial encryption keys from the server based on the authentication of the bonded pair of certificates.

12. The method of claim 11, further comprising:
communicating with a back-end server using the financial encryption keys and the secure processor; and
processing an authorization or decline response from the back-end server;
wherein the secure processor and the second processor are both located in a point of sale terminal.

13. The method of claim 11, further comprising:
receiving secure data via a first input device;
receiving additional secure data via a second input device;
processing the secure data and the additional secure data using the secure processor to produce stored secure data; and
encrypting the stored secure data in bulk, using the financial encryption keys, for transmission to a back-end server;
wherein the first input device is a touch screen on a point of sale terminal; and
wherein the second input device is a card reader on the point of sale terminal.

14. The method of claim 11, further comprising:
receiving secure data from a user via an input device;
processing the secure data using the secure processor and a first memory to produce encrypted secure data;
receiving non-secure data from the user via the input device; and
processing the non-secure data using the second processor and a second memory.

15. The method of claim 14, wherein:
the first memory stores the first public-key certificate; and
the second memory stores the second public-key certificate.

16. The method of claim 14, wherein:
the first memory and the second memory are separate and distinct hardware components; and
the second processor cannot address the first memory.

17. The method of claim 14, further comprising:
instantiating a virtual keypad for the user on a touch screen display;
wherein the input device is the touch screen display; and
wherein the secure data is a personal identification number entered via the virtual keypad.

18. The method of claim 14, wherein:
the input device is a card reader; and
the secure data is a credit card number.

19. The method of claim 14, further comprising:
routing the secure data to the secure processor using a multiplexer;
routing the non-secure data to the second processor using the multiplexer; and
altering a routing state of the multiplexer using the secure processor;
wherein the routing state of the multiplexer is only controlled by the secure processor.

20. The method of claim 19, wherein:
the secure processor and the multiplexer are located on a single integrated circuit;
the multiplexer is a block of circuitry on the single integrated circuit; and
the secure processor controls the multiplexer via interconnects in the single integrated circuit.

21. A method comprising:
injecting a first public key into a first discrete microcontroller, wherein the first discrete microcontroller includes a secure processor;
signing a certificate signing request from the secure processor to generate a first public-key certificate;
injecting a second public key into a second discrete microcontroller, wherein the second discrete microcontroller includes a second processor; and
signing a second certificate signing request from the second processor to generate a second public-key certificate;
wherein the first and second discrete microcontrollers are both part of a single point of sale terminal;
wherein the first public-key certificate and the second public-key certificate form a bonded pair of certificates; and
wherein the bonded pair of certificates form a persistent identity for the secure processor and the second processor.

22. The method of claim 21, further comprising:
transmitting financial encryption keys from a server to the point of sale device in response to an authentication of the bonded pair of certificates; and
encrypting, using the financial encryption keys, payment information received on the point of sale device.

23. The method of claim 22, wherein:
the second processor instantiates an operating system for the point of sale terminal;
the encrypting is conducted by the secure processor;
the financial encryption keys are stored in a first memory;
the secure processor has access to the first memory and the second processor does not have access to the first memory; and
the point of sale device includes a discrete battery for the first memory.

24. The method of claim 21, wherein:
the signing is conducted by a certificate authority; and
the injecting is conducted via remote key injection.

25. The method of claim 21, further comprising:
receiving secure data from a user via an input device;
processing the secure data using the secure processor and a first memory to produce encrypted secure data;

receiving non-secure data from the user via the input device; and processing the non-secure data using the second processor and a second memory.

* * * * *